United States Patent
Ng et al.

(10) Patent No.: US 11,562,258 B2
(45) Date of Patent: *Jan. 24, 2023

(54) MULTI-DIMENSIONAL COGNITION FOR UNIFIED COGNITION IN COGNITIVE ASSISTANCE

(71) Applicant: International Business Machines Corporation, Armonk, NY (US)

(72) Inventors: Joanna W. Ng, Unionville (CA); Ernest Grady Booch, Littleton, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/405,790

(22) Filed: May 7, 2019

(65) Prior Publication Data
US 2019/0266494 A1     Aug. 29, 2019

Related U.S. Application Data

(63) Continuation of application No. 15/813,118, filed on Nov. 14, 2017.

(51) Int. Cl.
*G06N 5/02*     (2006.01)
*G06N 20/00*    (2019.01)

(52) U.S. Cl.
CPC ............... *G06N 5/02* (2013.01); *G06N 20/00* (2019.01)

(58) Field of Classification Search
CPC ....... G06N 5/00–048; G06N 7/00–026; G06N 20/00; G05B 13/00; G05B 13/024–0295; G16Y 30/00
USPC ............... 700/29–33, 47–48; 706/12, 45–61
See application file for complete search history.

(56) References Cited

U.S. PATENT DOCUMENTS

| | | | |
|---|---|---|---|
| 6,427,063 B1 | 7/2002 | Cook et al. |
| 7,526,465 B1 | 4/2009 | Forsythe et al. |
| 9,082,402 B2 | 7/2015 | Yadgar et al. |
| 9,349,100 B2 | 5/2016 | Kozloski et al. |
| 9,390,706 B2 | 7/2016 | Gustafson et al. |
| 9,792,397 B1 | 10/2017 | Nagaraja |
| 10,262,019 B1 | 4/2019 | Reiner et al. |

(Continued)

OTHER PUBLICATIONS

Wu et al. "Cognitive Internet of Things: A New Paradigm Beyond Connection", 2014, IEEE Internet of Things Journal, vol. 1, No. 2.*

(Continued)

*Primary Examiner* — Jue Louie
(74) *Attorney, Agent, or Firm* — Konrad Raynes Davda & Victor LLP; Janaki K. Davda

(57) ABSTRACT

Provided are techniques for unified cognition for a virtual personal cognitive assistant. Internet of Things (IoT) devices are coupled to a cognitive model, wherein the cognitive model includes a cognitive classifier, and wherein the cognitive classifier includes a cognitive dimension map and a recognition process. Input from one or more of the IoT devices is received. The cognitive dimension map is used to identify rules based on the input. The recognition process is used to identify events based on the rules. Then, the events are issued to one or more of the IoT devices, wherein the one or more IoT devices execute actions in response to the events.

5 Claims, 22 Drawing Sheets

(56) References Cited

U.S. PATENT DOCUMENTS

| | | | |
|---|---|---|---|
| 10,448,454 | B1 | 10/2019 | Tao et al. |
| 10,528,873 | B2 | 1/2020 | Sanchez et al. |
| 11,429,874 | B2 | 8/2022 | Ng et al. |
| 11,443,196 | B2 | 9/2022 | Ng et al. |
| 2007/0038436 | A1 | 2/2007 | Cristo et al. |
| 2008/0015418 | A1 | 1/2008 | Jarrell et al. |
| 2009/0006283 | A1* | 1/2009 | Labrie .................. G06F 16/215 706/12 |
| 2009/0228407 | A1 | 9/2009 | Ramesh et al. |
| 2010/0235307 | A1 | 9/2010 | Sweeney et al. |
| 2010/0250196 | A1 | 9/2010 | Lawler et al. |
| 2012/0330869 | A1 | 12/2012 | Durham |
| 2013/0152092 | A1 | 6/2013 | Yadgar |
| 2014/0067729 | A1 | 3/2014 | Kozloski et al. |
| 2014/0148962 | A1 | 5/2014 | Venayagamoorthy |
| 2014/0245140 | A1 | 8/2014 | Brown et al. |
| 2014/0375547 | A1 | 12/2014 | Katz et al. |
| 2015/0356412 | A1 | 12/2015 | Faith et al. |
| 2015/0356430 | A1 | 12/2015 | Saxena et al. |
| 2015/0356437 | A1 | 12/2015 | Sanchez et al. |
| 2015/0356460 | A1 | 12/2015 | Sanchez et al. |
| 2015/0371663 | A1 | 12/2015 | Gustafson et al. |
| 2016/0073947 | A1 | 3/2016 | Anderson |
| 2016/0132482 | A1 | 5/2016 | Salome et al. |
| 2016/0180222 | A1 | 6/2016 | Sierhuis et al. |
| 2016/0217371 | A1 | 7/2016 | Leithiser |
| 2016/0283494 | A1 | 9/2016 | Krishnaswamy et al. |
| 2017/0006141 | A1* | 1/2017 | Bhadra ................. H04W 84/18 |
| 2017/0155601 | A1 | 6/2017 | Ellis et al. |
| 2017/0293851 | A1 | 10/2017 | Chawla et al. |
| 2017/0329867 | A1 | 11/2017 | Lindsley |
| 2018/0205793 | A1* | 7/2018 | Loeb ..................... G06T 19/003 |
| 2018/0218266 | A1 | 8/2018 | Halim et al. |
| 2018/0232648 | A1 | 8/2018 | Acharya |
| 2018/0276005 | A1 | 9/2018 | James |
| 2019/0147347 | A1 | 5/2019 | Ng et al. |
| 2019/0147348 | A1 | 5/2019 | Ng et al. |
| 2019/0147349 | A1 | 5/2019 | Ng et al. |
| 2020/0134491 | A1 | 4/2020 | Cruise |
| 2020/0272911 | A1* | 8/2020 | Quiros Araya .......... G06N 3/08 |

OTHER PUBLICATIONS

Cai, H. and Y. Lin, "Coordinating Cognitive Assistance With Cognitive Engagement Control Approaches in Human-Machine Collaboration", IEEE Transactions on Systems, Man, and Cybernetics—Part A: Systems and Humans, vol. 42, No. 2, Mar. 2012, retrieved from the Internet at <URL: http://ieeexplore.ieee.org/document/6059509/>, Total 9 pp.
Garlan, D. and B. Schmerl, "The RADAR Architecture for Personal Cognitive Assistance", Computer Science Department, International Journal of Software Engineering and Knowledge Engineering © World Scientific Publishing Company, retrieved from the Internet at <URL: http://repository.cmu.edu/cgi/viewcontent.cgi?article=1653&context=compsci>, Apr. 2007, Total 21 pp.
Giroux, S., M. Castebrunet, O. Boissier, V. Rialle, "A Multiagent Approach to Personalization and Assistance to Multiple Persons in a Smart Home", Artificial Intelligence Applied to Assistive Technologies and Smart Environments: Papers from the AAAI-14 Workshop, retrieved from the Internet at <URL: http://www.aaai.org/ocs/index.php/WS/AAAIW14/paper/view/8809/8371>, Copyright © 2014, Total 5 pp.
Giuliano, A., "Cognitive Assistant App: it's easy with IBM Bluemix", [online], [Retrieved on Jul. 20, 2017], posted on Mar. 25, 2016, retrieved from the Internet at <URL: http://www.poip.me/blog/lean-startup/cognitive-assistant-app/>, Total 7 pp.
IBM, "IBM Watson to Power SoftBank Robotics' Pepper", Jan. 6, 2017, [online], [Retrieved on Nov. 7, 2017]. Retrieved from the Internet at <URL: https://www-03.ibm.com/press/us/en/pressrelease/48763.wss>, Total 2 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Sep. 2011, Computer Security Division Information Technology Laboratory National Institute of Standards and Technology, Total 7 pp.
Wang, Y., "Formal Cognitive Models of Data, Information, Knowledge, and Intelligence", WSEAS Transactions on Computers, International Institute of Cognitive Informatics and Cognitive Computing (ICIC) Laboratory for Computational Intelligence and Software Science, retrieved from the Internet at <URL: https://www.researchgate.net/profile/Yingxu_Wang/publication/279499808_Formal_Cognitive_Models_of_Data_Information_Knowledge_and_Intelligence/links/5593c20708ae5af2b0eba546.pdf>, Total 12 pp.
Preliminary Amendment, filed Apr. 30, 2019, for U.S. Appl. No. 15/813,113, 6 pp. [57.408 (PrelimAmend)].
Application for U.S. Appl. No. 16/399,676, 73 pp., filed Apr. 30, 2019. [57.408C1 (Appln)].
Preliminary Amendment, filed Apr. 30, 2019, for U.S. Appl. No. 16/399,676, 27 pp. [57.408C1 (PrelimAmend)].
Preliminary Amendment, filed May 2, 2019, for U.S. Appl. No. 15/813,116, 6 pp. [57.410 (PrelimAmend)].
Application for U.S. Appl. No. 16/402,118, 73 pp., filed May 2, 2019. [57.410C1 (Appln)].
Preliminary Amendment, filed May 2, 2019, for U.S. Appl. No. 16/402,118, 27 pp. [57.410C1 (PrelimAmend)].
Preliminary Amendment, filed May 7, 2019, for U.S. Appl. No. 15/813,118, 5 pp. [57.411 (PrelimAmend)].
List of IBM Patents or Patent Applications Treated as Related, 2 pp., dated May 28, 2019. [57.411C1 (Appendix P)].
Advisory Action for U.S. Appl. No. 15/813,113, 5 pp., dated Dec. 29, 2021. [57.408 (AdvAct)].
Advisory Action for U.S. Appl. No. 16/399,676, 5 pp., dated Dec. 29, 2021. [57.408C1 (AdvAct)].
Office Action 1 for U.S. Appl. No. 15/813,113, 37 pp., dated Jun. 8, 2021. [57.408 (OA1)].
Response to Office Action 1 for U.S. Appl. No. 15/813,113, 19 pp., dated Sep. 8, 2021. [57.408 (ROA1)].
Final Office Action 1 for U.S. Appl. No. 15/813,113, 21 pp., dated Oct. 5, 2021. [57.408 (FOA1)].
Response to Final Office Action 1 for U.S. Appl. No. 15/813,113, 15 pp., dated Dec. 6, 2021. [57.408 (RFOA1)].
Office Action 1 for U.S. Appl. No. 16/399,676, 28 pp., dated Jun. 8, 2021. [57.408C1 (OA1)].
Response to Office Action 1 for U.S. Appl. No. 16/399,676, 16 pp., dated Sep. 8, 2021. [57.408C1 (ROA1)].
Final Office Action 1 for U.S. Appl. No. 16/399,676, 19 pp., dated Oct. 5, 2021. [57.40801 (FOA1)].
Response to Final Office Action 1 for U.S. Appl. No. 16/399,676, 13 pp., dated Dec. 6, 2021. [57.40801 (RFOA1)].
Office Action 1 for U.S. Appl. No. 15/813,116, 38 pp., dated Mar. 25, 2021. [57.410 (OA1)].
Response to Office Action 1 for U.S. Appl. No. 15/813,116, 16 pp., dated Jun. 25, 2021. [57.410 (ROA1)].
Final Office Action 1 for U.S. Appl. No. 15/813,116, 27 pp., dated Sep. 17, 2021. [57.410 (FOA1)].
Response to Final Office Action 1 for U.S. Appl. No. 15/813,116, 15 pp., dated Nov. 17, 2021. [57.410 (RFOA1)].
Advisory Action for U.S. Appl. No. 15/813,116, 5 pp., dated Nov. 29, 2021. [57.410 (AdvAct)].
Office Action 1 for U.S. Appl. No. 16/402,118, 32 pp., dated Mar. 29, 2021. [57.410C1 (OA1)].
Response to Office Action 1 for U.S. Appl. No. 16/402,118, 13 pp., dated Jun. 25, 2021. [57.410C1 (ROA1)].
Final Office Action 1 for U.S. Appl. No. 16/402,118, 24 pp., dated Sep. 17, 2021. [57.410C1 (FOA1)].
Response to Final Office Action 1 for U.S. Appl. No. 16/402,118, 11 pp., dated Nov. 17, 2021. [57.410C1 (RFOA1)].
Advisory Action for U.S. Appl. No. 16/402,118, 5 pp., dated Nov. 29, 2021. [57.410C1 (AdvAct)].

(56) References Cited

OTHER PUBLICATIONS

Office Action 1 for U.S. Appl. No. 15/813,118, 23 pp., dated Jun. 10, 2021. [57.411 (OA1)].

Corrected Office Action 1 for U.S. Appl. No. 15/813,118, 9 pp., dated Jun. 23, 2021. [57.411 (CorrOA1)].

Response to Office Action 1 for U.S. Appl. No. 15/813,118, 13 pp., dated Sep. 9, 2021. [57.411 (ROA1)].

Final Office Action 1 for U.S. Appl. No. 15/813,118, 13 pp., dated Sep. 21, 2021. [57.411 (FOA1)].

Response to Final Office Action 1 for U.S. Appl. No. 15/813,118, 13 pp., dated Nov. 22, 2021. [57.411 (RFOA1)].

Advisory Action for U.S. Appl. No. 15/813,118, 4 pp., dated Dec. 9, 2021. [57.411 (AdvAct)].

Moulin-Frier, C., et al., "DAC-h3: A Proactive Robot Cognitive Architecture to Acquire and Express Knowledge About the World and Self", Sep. 18, 2017, Preprint Accessed Jun. 1, 2021 from <https:arxiv.org/abs/170603661v2> (Year: 2017), 18 pp.

Response dated Apr. 27, 2022, pp. 19, to Office Action, for U.S. Appl. No. 15/813,113 (57.408).

Response dated Apr. 27, 2022, pp. 16, to Office Action for U.S. Appl. No. 16/399,676 (57.408C1).

Office Action dated Jan. 21, 2022, pp. 21, for U.S. Appl. No. 15/813,118 (57.411).

Response dated Apr. 20, 2022, pp. 15, to Office Action dated Jan. 21, 2022, pp. 21, for U.S. Appl. No. 15/813,118 (57.411).

Office Action dated Feb. 22, 2022, pp. 23, for U.S. Appl. No. 15/813,113 (57.408).

Office Action dated Feb. 22, 2022, pp. 21, for U.S. Appl. No. 16/399,676 (57.408C1).

Yueh, et al., "A Virtual Travel Agent System for M-Tourism with Semantic Web Service Based Design and Implementation", 21st International Conference on Advanced Networking and Applications (AINA), IEEE, 2007, pp. 8.

Best, et al., "Teamwork, Communication, and Planning in ACT-R Agents Engaging in Urban Combat in Virtual Environments", in Proceedings of the 2003 IJCAI workshop on cognitive modeling of agents and multi-agents interactions, 2003, pp. 9.

Office Action dated Jun. 13, 2022, pp. 29, for U.S. Appl. No. 15/813,116 (57.410).

Office Action dated Jun. 13, 2022, pp. 26, for U.S. Appl. No. 16/402,118 (57.410C1).

Sakagami, et al., "The intelligent ASIMO: System overview and integration", In IEEE/RSJ International conference on intelligent robots and systems, vol. 3, IEEE, 2002, pp. 7.

Notice of Allowance dated Jul. 8, 2022, pp. 19, for U.S. Appl. No. 15/813,113.

Notice of Allowance dated Jun. 29, 2022, pp. 18, for U.S. Appl. No. 16/399,676.

Notice of Allowance dated Jun. 24, 2022, pp. 17, for U.S. Appl. No. 15/813,118.

Notice of Allowance dated Aug. 10, 2022, pp. 9, for U.S. Appl. No. 15/813,118.

Kar, et al., "Applying Chatbots to the Internet of Things: Opportunities and Architectural Elements", Nov. 11, 2016, arXiv:1611.03799, pp. 1-9.

Response dated Sep. 13, 2022, 14 pp., to Office Action for U.S. Appl. No. 15/813,116.

Notice of Allowance dated Oct. 7, 2022, 16 pp., for U.S. Appl. No. 15/813,116.

Response dated Sep. 13, 2022, 12 pp., to Office Action for U.S. Appl. No. 16/402,118.

Notice of Allowance dated Nov. 2, 2022 pp. 9, for U.S. Appl. No. 15/813,118.

Notice of Allowance dated Nov. 28, 2022, 11 pp., for U.S. Appl. No. 16/402,118.

\* cited by examiner

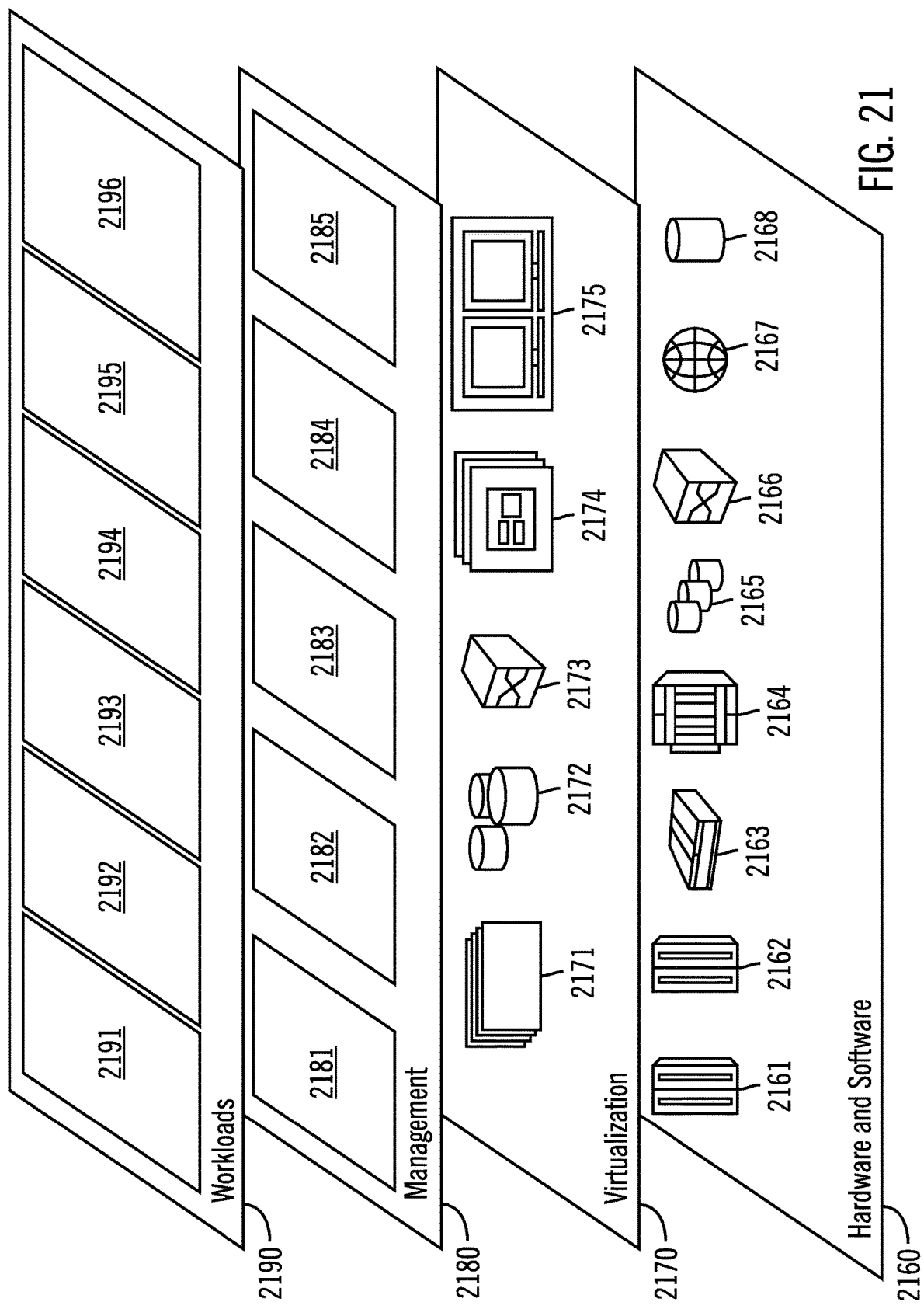

MULTI-DIMENSIONAL COGNITION FOR UNIFIED COGNITION IN COGNITIVE ASSISTANCE

FIELD

Embodiments of the invention relate to providing multi-dimensional cognition for unified cognition in cognitive assistance.

BACKGROUND

Embodied cognition may be described as placing cognitive computing capabilities in a cognitive computing system of an object (e.g., a robot, an avatar, etc.) of the physical world. This enhances cognitive computing capabilities of the cognitive computing system in understanding, reasoning, learning, and other cognitive processes by providing the cognitive computing system the ability to see, hear, talk, move, etc. through the object. In turn, such a cognitive computing system is enabled to provide human cognitive abilities through user and object partnership and collaborations.

An example of such embodied cognition includes embodied cognition in a speaker with the ability to engage users in natural language dialogue for conducting tasks such as ordering items for purchase. Another example of such embodied cognition includes embodied cognition in a robot to interact with customers for concierge services.

Conventional implementations of embodied cognition focus on embedding cognitive computing capabilities in one object of the physical world, with a set of functions pre-loaded onto the object, and let humans, as generic users, come to interact with that object as a single instance of embodied cognition. That is, a conventional implementation primarily covers a single embodied cognition object that interacts generically with multiple users.

For example, an object that has face recognition may call a user in front of that object by name or look up records for that user.

SUMMARY

In accordance with embodiments, a computer-implemented method is provided for providing unified cognition for a virtual personal cognitive assistant. The computer-implemented method comprises: coupling Internet of Things (IoT) devices to a cognitive model, wherein the cognitive model includes a cognitive classifier, and wherein the cognitive classifier includes a cognitive dimension map and a recognition process; receiving input from one or more of the IoT devices; using the cognitive dimension map to identify rules based on the input; using the recognition process to identify events based on the rules; and issuing the events to one or more of the IoT devices, wherein the one or more IoT devices execute actions in response to the events.

In accordance with other embodiments, a computer program product is provided for providing unified cognition for a virtual personal cognitive assistant. The computer program product comprising a computer readable storage medium having program code embodied therewith, the program code executable by at least one processor to perform operations comprising: coupling Internet of Things (IoT) devices to a cognitive model, wherein the cognitive model includes a cognitive classifier, and wherein the cognitive classifier includes a cognitive dimension map and a recognition process; receiving input from one or more of the IoT devices; using the cognitive dimension map to identify rules based on the input; using the recognition process to identify events based on the rules; and issuing the events to one or more of the IoT devices, wherein the one or more IoT devices execute actions in response to the events.

In yet other embodiments, a computer system is provided for providing unified cognition for a virtual personal cognitive assistant. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: coupling Internet of Things (IoT) devices to a cognitive model, wherein the cognitive model includes a cognitive classifier, and wherein the cognitive classifier includes a cognitive dimension map and a recognition process; receiving input from one or more of the IoT devices; using the cognitive dimension map to identify rules based on the input; using the recognition process to identify events based on the rules; and issuing the events to one or more of the IoT devices, wherein the one or more IoT devices execute actions in response to the events.

BRIEF DESCRIPTION OF THE SEVERAL VIEWS OF THE DRAWINGS

Referring now to the drawings in which like reference numbers represent corresponding parts throughout:

FIG. 21 illustrates abstraction model layers in accordance with certain embodiments.

DETAILED DESCRIPTION

Figure 1:
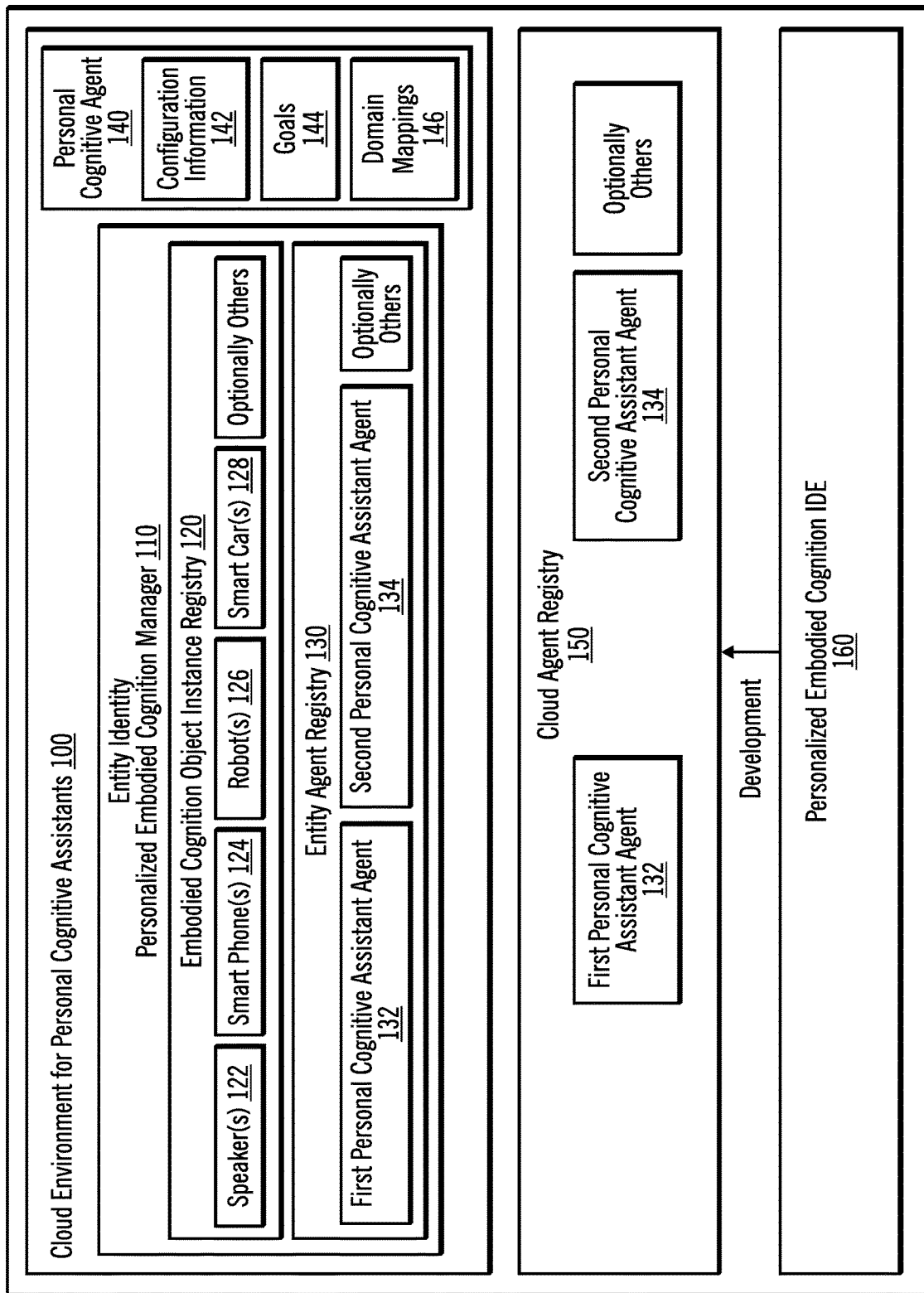
FIG. 1 illustrates, in a block diagram, a computing environment for providing unified cognition for a cognitive assistant in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Unified Cognition for a Virtual Personal Cognitive
Assistant of an Entity When Consuming Multiple,
Distinct Domains at Different Points in Time With certain embodiments, an entity may use a virtual personal cognitive assistant to manage multiple, distinct domains of cognitive assistant agents, at different points in time over a long time period. Different entities may employ different combinations domains of cognitive assistant agents. A domain may be described as any grouping, such as a grouping representing functions performed for that domain. Examples of domains include: personal shopping, personal banking, and personal health. For example, one entity may use personal shopping and personal banking cognitive assistant agents, while another entity may use personal shopping and personal health cognitive assistant agents.

With embodiments, a domain corresponds to a cognitive assistant agent for a particular area (e.g., banking, shopping, etc.). A domain may be described as any feature, function, and/or capability for the purpose of (a) the extension of cognitive capacity and (b) for the reduction of cognitive load in order to augment the natural cognition of the user for the set domain. Each domain may have two collaborating categories of cognitive capabilities, namely external interfacing capability (such as speech, sight, hearing, User Interface (UI), etc.) and internal cognition capability (such as knowledge, actions, insights etc.). With embodiments, the capabilities of a given cognitive assistant agent for a domain are packaged as one or multiple modules.

Unlike conventional implementations in which functions are preloaded into one embodied cognition object, for example, a robot, embodiments provide cognitive assistant agents of different domains that allow each of the cognitive assistant agents to be managed and coordinated by a personal cognitive agent as a digitized cognitive entity working on an entity's behalf. This allows one or more cognitive assistant agents of different domains to be dynamically loaded into an entity's embodied cognition object instance registry 120 for the enablement of ubiquitous access to a particular personal cognitive assistant.

With embodiments, each instance of a personal cognitive assistant has a corresponding designated entity of a unique individual, which may further comprise knowledge and data about the unique individuality of the entity.

With embodiments, each personal cognitive assistant aggregates cognitive assistant agents of different domains based on selections by the entity. Each cognitive assistant agent is of a specific domain scope and is also enabled to collaborate and communicate with other cognitive assistant agents of different domains to enable the integration into one cohesive, coherent entity instance of the cognitive assistant agents of different domains. Moreover, each cognitive assistant agent has a cognitive model with one or more cognitive capabilities (e.g., speech, vision, location, temporal, audio, etc.). Each of the cognitive capabilities is integrated into a cognitive semantic understanding as determined by the corresponding cognitive model.

In addition, each cognitive capability is further enabled to be embodied in one or multiple embodied cognition object instances to enable a ubiquitous accessibility of each cognitive assistant agent of a domain to the corresponding entity.

For example, an entity, such as a user, may initially use personal shopping as a first domain for a cognitive assistant agent. Then a few months later, the entity decides to add personal banking and personal health as two additional domains of cognitive assistant agents. Unlike with conventional systems, with certain embodiments, the different cognitive assistant agents operate as a unified cognition, in an integrated and inter-operable manner. For example, with certain embodiments, a goal for personal banking of capping grocery shopping to $600 a month is integrated into the personal shopping domain of the cognitive assistant agent.

Thus, embodiments enable unified cognition for integrated cognitive assistance experience from across multiple cognitive assistant agents of distinctively different domains, consumed at different points in time. In particular, embodiments enable a unified cognition for a virtual personal cognitive assistant of an entity, when consuming multiple, different domains.

FIG. 1 illustrates, in a block diagram, a computing environment for providing unified cognition for a cognitive assistant in accordance with certain embodiments. A cloud environment for personal cognitive assistants 100 includes, for an entity identity, a personalized embodied cognition manager 110. An entity may be a human user, an application program, an apparatus, a robot, etc. With embodiments, an entity identity represents the entity.

The personalized embodied cognition manager 110 works on the entity's behalf to manage multiple embodied cognition object instances and multiple uses of personal cognitive assistant agents. The entity's employment of embodied cognition object instances (e.g., Internet of Things (IoT) devices) is orthogonal to the entity's adoption of cognitive assistant agents of different domains. The embodied cognition object instances are of diversified embodied cognition object instance types. With certain embodiments, different embodied cognition object instance types have different cognitive capabilities.

The personalized embodied cognition manager 110 includes an embodied cognition object instance registry 120 ("object instance registry" 120), an entity agent registry 130, and a personal cognitive agent 140. The embodied cognition object instance registry 120 includes embodied cognition object instances, such as one or more speakers 122, one or more smart phones 124, one or more robots 126, one or more smart cars 128, etc. Embodied cognition object instances may be added to or removed from the embodied cognition object instance registry 120.

The entity agent registry 130 includes cognitive assistant agents for specific domains, such as a first personal cognitive assistant agent 132, a second personal cognitive assistant agent 134, etc. Cognitive assistant agents may be added to or removed from the entity agent registry 130.

With embodiments, each cognitive assistant agent may have its own embodied cognition object instances. For example, the embodied cognition object instance registry 120 may store a first embodied cognition object instance for a speaker for the first personal cognitive assistant agent 132 and may store a second embodied cognition object instance for a speaker for the second personal cognitive assistant agent 134. In various embodiments, each cognitive assistant agent may have the same or different embodied cognition object instances. In certain embodiments, cognitive assistant agents may share an embodied cognition object instance (e.g., share a speaker).

Each entity identity has a virtual personal cognitive assistant, referred to as the personal cognitive agent 140, which may be managed by the personalized embodied cognition manager 110. The personal cognitive agent 140 provides unified cognition from across multiple cognitive assistant agents that the entity employs and registers in the entity agent registry 130. That is, the personal cognitive agent 140 provides one unified cognition by integrating multiple cognitive assistant agents employed by the entity. In the example of FIG. 1, the personal cognitive agent 140 provides unified cognition of the first personal cognitive assistant agent 132 and the second personal cognitive assistant agent 134. The personal cognitive agent 140 includes configuration information 142, goals 144, and domain mappings 146. With embodiments, the configuration information 142 and the goals 144 may be set by the entity. With embodiments, the domain mappings 146 may be set by a system administrator and/or the entity. The configuration information 142 includes information about the entity, such as a location, social relationships, preferences, etc. The goals 144 indicate objectives that the entity wishes to attain. For example, a goal may be to pay off a loan, and this would be used to assess how much to spend on other items, such as food and apparel. The domain mappings 146 map terms to domains.

Figure 2:
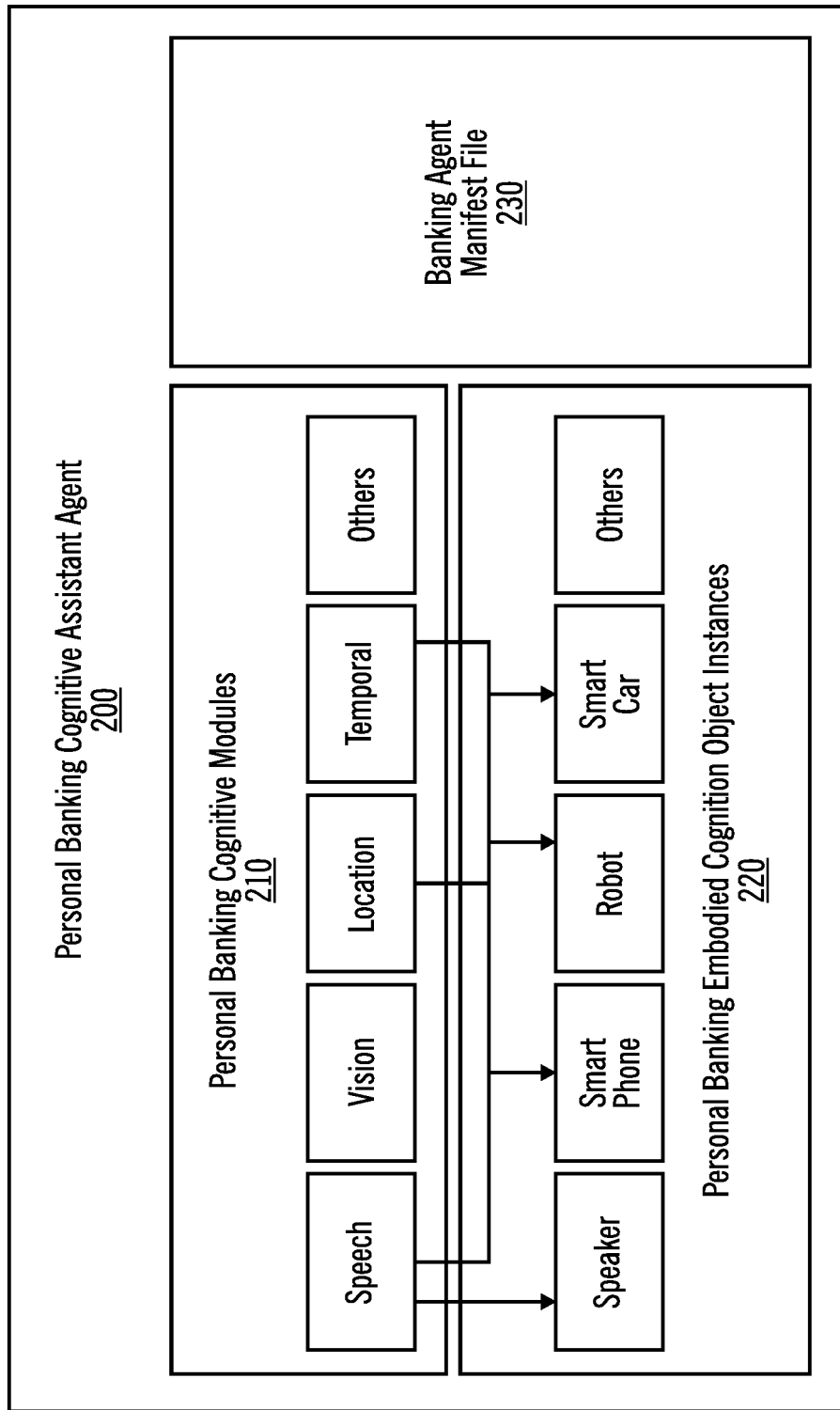
FIG. 2 illustrates an example of a personal banking cognitive assistant agent in accordance with certain embodiments.
Figure 3:
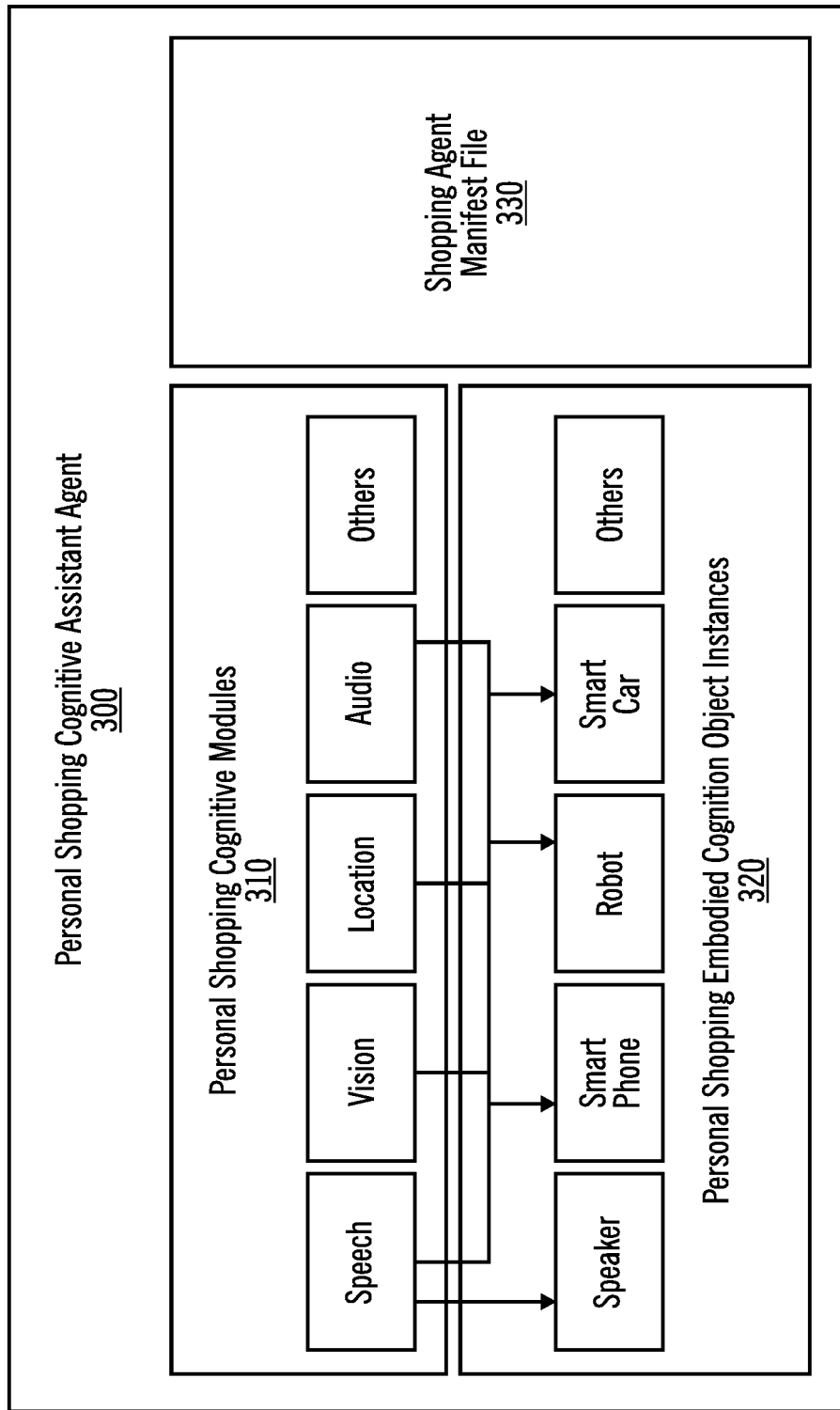
FIG. 3 illustrates an example of a personal shopping cognitive assistant agent in accordance with certain embodiments.

With certain embodiments, unified cognition from multiple cognitive assistant agents of different domains allows for a first personal cognitive assistant agent 132 and a second personal cognitive assistant agent 134. In addition, cognitive capabilities of a cognitive assistant agent of a domain are modularized into cognitive modules, such as shown in FIGS. 2-3.

With certain embodiments, a cognitive assistant agent is a software module created by extending cognitive computing services (e.g., via the cloud environment), including machine learning services, to implement a set domain scope, that provides personalized cognitive assistance to an entity.

With certain embodiments, the agents, including the personal cognitive agent 140, the first personal cognitive assistant agent 132, and the second personal cognitive assistant agent 134, comply with a programming model to enable proactive interaction (also referred to as an agent programming model).

In FIG. 1, a cloud agent registry 150 includes cognitive assistant agents that are registered with the cloud agent registry 150, such as the first personal cognitive assistant agent 132 and the second personal cognitive assistant agent 134. Also, a personalized embodied cognition Integrated Development Environment (IDE) 160 is a development environment providing a framework for creating cognitive assistant agents. The cloud agent registry 150 resides in the cloud environment for personal cognitive assistants 100 to register cognitive assistant agents that are created (e.g., by developers) from the personalized embodied cognition IDE 160.

FIG. 2 illustrates an example of a personal banking cognitive assistant agent 200 in accordance with certain embodiments. For example, the first personal cognitive assistant agent 132 may be a personal banking cognitive assistant agent 200. The personal banking cognitive assistant agent 200 includes personal banking cognitive modules 210 that are linked to particular personal banking embodied cognition object instances 220. The personal banking cognitive modules 210 include modules for: speech, vision, location, temporal (i.e., time), and optionally others. The personal banking embodied cognition object instances are: speaker, smart phone, robot, smart car, and optionally others. The personal banking cognitive assistant agent 200 also includes a banking agent manifest file 230.

FIG. 3 illustrates an example of a personal shopping cognitive assistant agent 300 in accordance with certain embodiments. For example, the and second personal cognitive assistant agent 134 may be a personal shopping cognitive assistant agent 300. The personal shopping cognitive assistant agent 300 includes personal shopping cognitive modules 310 that are linked to particular personal shopping embodied cognition object instances 320. The personal shopping cognitive modules 310 include modules for: speech, vision, location, audio, and optionally others. The personal shopping embodied cognition object instances are: speaker, smart phone, robot, smart car, and optionally others. The personal shopping cognitive assistant agent 300 also includes a shopping agent manifest file 330.

With reference to FIGS. 2 and 3, the personal banking cognitive assistant agent 200 has a cognitive module for temporal, which the personal shopping cognitive assistant agent 300 does not have. However, the personal shopping cognitive assistant agent 300 has a cognitive module for audio, which the personal banking cognitive assistant agent 200 does not have. In various embodiments, any instance of a cognitive assistant agent for any domain (banking, shopping, etc.) may be customized with cognitive modules. For example, another personal shopping cognitive assistant agent (e.g., for a different entity) may include a cognitive module for temporal in addition to or instead of audio.

Other examples of cognitive assistant agents include: personal investment cognitive assistant agent, personal banking and investment cognitive assistant agent, personal smart home cognitive assistant agent, personal aging parental care cognitive assistant agent, personal health cognitive assistant agent, etc.

Each cognitive module is optional. However, each cognitive assistant agent has at least one cognitive module.

With certain embodiments, the personal cognitive agent 140 runs inside the personalized embodied cognition manager 110. In other embodiments, the personal cognitive agent 140 runs outside the personalized embodied cognition manager 110. The personal cognitive agent 140 provides unified cognition across different cognitive assistant agents and across multiple embodied cognition object instances. As a first example, the personal cognitive agent 140 consolidates entity interactions of one given cognitive capability (e.g., speech) across multiple embodied cognition object instances for a given cognitive assistant agent. For example: in a personal shopping cognitive assistant agent having the cognitive ability of speech, the personal cognitive agent 140 consolidates: a home speaker (June 15) (that hears: if sirloin steak is less than $30 a pound, buy 3 pounds) with a smart phone in the super market (June 16) (that understands that milk will expire in three days) with a smart car on the road (June 17) (that understands: don't forget to pick up veggies and fruit). Other cognitive capabilities to be consolidated from multiple embodied cognition object instances of interaction for a given cognitive assistant agent include: conversation, audio, graphical interfaces, visual, kinetics, and optionally others.

As a second example, the personal cognitive agent 140 consolidates entity interactions of multiple cognitive capabilities across multiple embodied cognition object instances for the same cognitive assistant agent. For example, the entity's location module and temporal module are integrated with the speech module for the entities personal cognitive agent 140 and the personal shopping cognitive assistant agent 300 indicates: "there is a store near you to pick up these items before your next meeting".

As a third example, the personal cognitive agent 140 consolidates multiple cognitive capabilities of multiple cognitive assistant agents for the entity's united cognition of the personal cognitive agent 140. For example, given two cognitive assistant agents, such as the personal banking cognitive assistant agent 200 and the personal shopping cognitive assistant agent 300, the personal cognitive agent 140 determines that "the entity has $300 left spending room for grocery this month" based on interaction with the personal banking cognitive assistant agent 200 and indicates to the personal shopping cognitive assistant agent 300: "the entity has $300 left spending room for grocery this month".

With certain embodiments, a unified cognition for a virtual personal cognitive assistant of an entity for multiple, different domains is enabled. Initially, a software developer uses the personalized embodied cognition IDE 160 to create a cognitive assistant agent according to the agent's programming model (e.g., as in FIGS. 2-3). The personalized embodied cognition IDE 160 programming model is followed to create cognitive modules relevant for the domain scope of the cognitive assistant agent. One or more object instantiations are created for embodied cognition object instances for the domain of the cognitive assistant agent. Then, the cognitive assistant agent is published to the cloud agent registry 150.

Once one or more cognitive assistant agents are created, an entity may log in to the cloud for personal cognitive assistant 140 to access the personalized embodied cognition manager 110. Then, the personal cognitive agent 140 provides a list of the available cognitive assistant agents. In response to entity selection of a cognitive assistant agent (e.g., personal banking cognitive assistant agent 200 or personal shopping cognitive assistant agent 300), the personal cognitive agent 140 downloads the selected cognitive assistant agent from the cloud agent registry 150 into the entity agent registry 130.

The personal cognitive agent 140 automatically configures the selected cognitive assistant agent according to the configuration information 142 associated with the entity (e.g., personal information (such as location), social relationships, preferences, etc.).

The personal cognitive agent 140 automatically configures the cognitive capabilities for each embodied cognition object that the entity has registered in the embodied cognition object instance registry 120. For each registered embodied cognition object, the personal cognitive agent 140 looks at the agent manifest file for the cognitive assistant agent to locate the embodied cognition object instance of each cognitive module for that embodied cognition object instance. The personal cognitive agent 140 downloads and configures, for each embodied cognition object in the embodied cognition object instance registry 120, the corresponding cognitive modules to an embodied cognition kernel, which is associated with the corresponding embodied cognition object instance.

When more than one cognitive assistant agent is being used by the entity, the personal cognitive agent 140 directs all interactions between the cognitive assistant agents. The interactions include, for example: conversation services, audio services, graphical interface services, visual services, kinetic services, and optionally others (e.g., illustrated in FIG. 14). For example, the personal cognitive agent 140 will go through each cognitive assistant agent to find a match to any input from the entity. For example: when the entity talks about buying groceries, the personal cognitive agent 140 finds a match to the personal shopping cognitive assistant agent, but does not find a match to the personal banking cognitive assistant agent 200.

As the entity continues to interact with the cognitive assistant agent, by interacting with multiple embodied cognition object instances (e.g., speaker at home, smart phone on the go, smart car on the road, etc.), the personal cognitive agent 140 acts as a virtual personal cognitive assistant that represents the multiple cognitive assistant agents and coordinates the cognitive assistant agents.

The personal cognitive agent 140 integrates, for each cognitive module of the same cognitive capability (e.g., speech), across multiple embodied cognition object instances, into one unified cognition of that cognitive capability.

Thus, embodiments enable unified cognition for a cognitive assistant of an entity identity, when consuming multiple, distinct domains at different points in time. Embodiments associate a personal cognitive agent 140 managed by a personalized embodied cognition manager 110 with an identity of an entity (e.g., a user), where the personalized embodied cognition manager 110 manages, on behalf of the entity, multiple embodied cognition object instances and multiple uses of cognitive assistant agents. Also, the personalized embodied cognition manager 110 uses an embodied cognition object instance registry 120, an entity agent registry 130, and a personal cognitive agent 140 to enable unified cognition from multiple cognitive assistant agents of different domains. With embodiments, the domains are modularized into cognitive assistant agents. Also, with embodiments, a given cognitive assistant agent of a particular domain has cognitive modules in compliance with an agent programming model for cognitive computing comprising a predetermined cognitive model, embodied cognition object instances, and a cognitive control in an architectural pattern.

Embodiments create a cognitive assistant agent as a software module by extending cognitive computing services including use of cloud services and machine learning services, to implement a domain that provides entities with personalized cognitive assistance, where the personalized embodied cognition IDE 160 provides a framework for a composition structure of a cognitive assistant agent.

Embodiments download a cognitive capability fit for a particular embodied cognition object, where an embodied cognition kernel resides in the particular embodied cognition object and is a runtime container for an instantiation of a cognitive module for that embodied cognition object instance type. Each cognitive capability (e.g., speech or vision) has a respective cognitive model that is orthogonal to an embodied cognition object of its embodiment and cognitive control. Each cognitive capability is encapsulated in a corresponding cognitive module. Each cognitive module, as one element of a particular model in the agent programming model, implements a function, a flow, and actions of a functional scope of the cognitive assistant agent.

Figure 4:
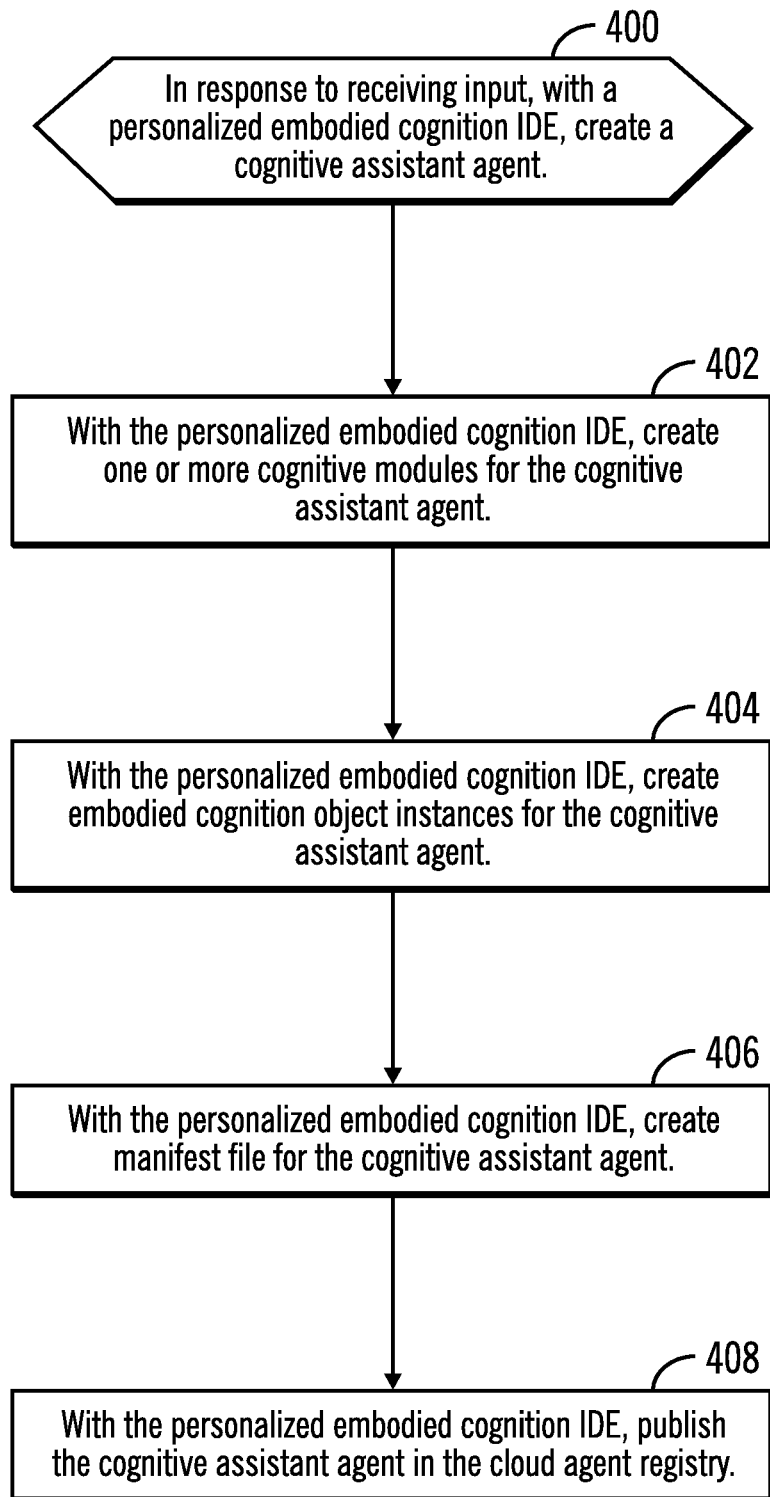
FIG. 4 illustrates, in a flowchart, operations for creating a cognitive assistant agent in accordance with certain embodiments.

FIG. 4 illustrates, in a flowchart, operations for creating a cognitive assistant agent in accordance with certain embodiments. Control begins at block 400 with, the personalized embodied cognition IDE 160, in response to receiving input, creating a cognitive assistant agent. The input received is to create the cognitive assistant agent for a particular domain (e.g., a personal banking cognitive assistant agent or a personal shopping cognitive assistant agent). In block 402, the personalized embodied cognition IDE 160, creates one or more cognitive modules (such as cognitive modules 210 or 310) for the cognitive assistant agent. In block 404, the personalized embodied cognition IDE 160 creates embodied cognition object instances (such as embodied cognition object instances 220 or 320) for the cognitive assistant agent. In block 406, the personalized embodied cognition IDE 160 creates a manifest file (such as manifest files 230 or 330) for the cognitive assistant agent. In block 408, the personalized embodied cognition IDE 160 publishes the cognitive assistant agent in the cloud agent registry 150.

Figure 5A:
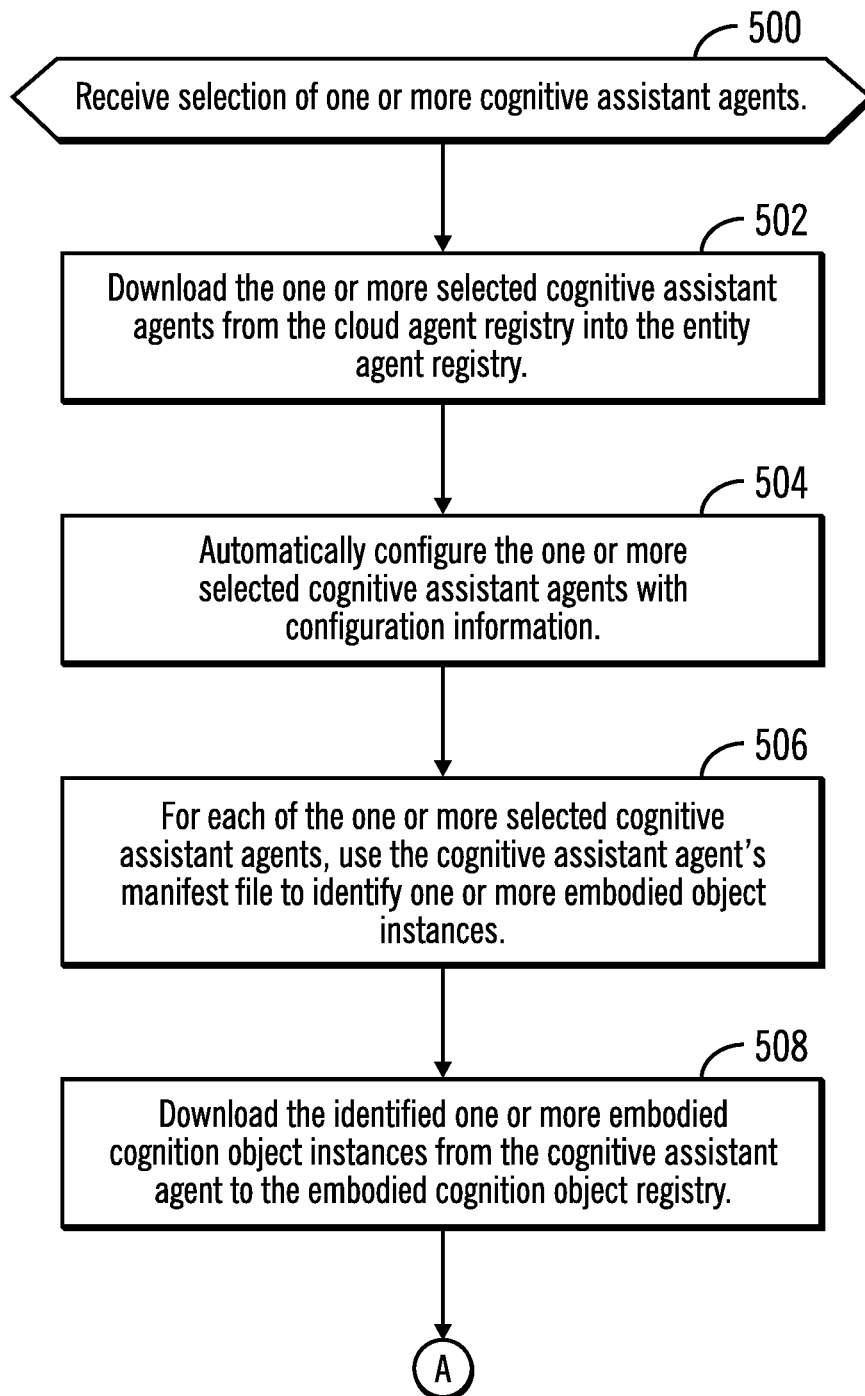
FIGS. 5A and 5B illustrate, in a flowchart, operations for configuring embodied cognition object instances for a cognitive assistant agent in accordance with certain embodiments.
Figure 5B:
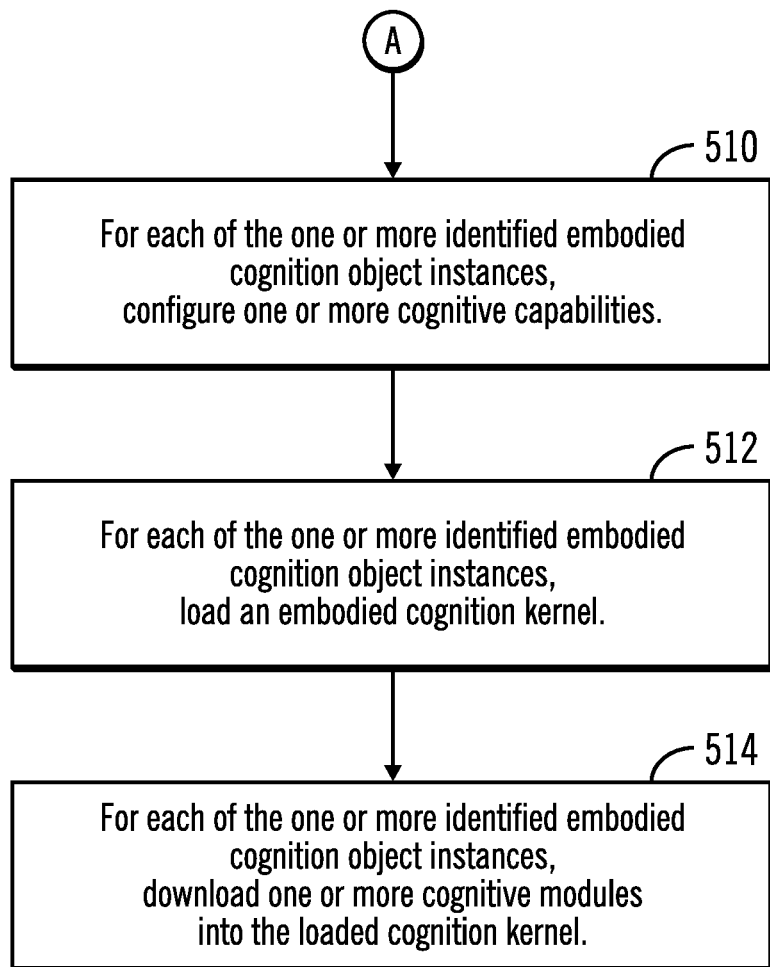

FIGS. 5A and 5B illustrate, in a flowchart, operations for configuring embodied cognition object instances for a cognitive assistant agent in accordance with certain embodiments. Control begins at block 500 with the personal cognitive agent 140 receiving selection of one or more cognitive assistant agents. That is, a list of one or more available cognitive assistant agents registered (stored) in the cloud agent registry 150 is provided to an entity, and the entity selects one or more of the cognitive assistant agents. For example, the entity may select the personal banking cognitive assistant agent 200 and the personal shopping cognitive assistant agent 300.

In block 502, the personal cognitive agent 140 downloads the one or more selected cognitive assistant agents from the cloud agent registry 150 into the entity agent registry 130. For example, the personal cognitive agent 140 downloads the personal banking cognitive assistant agent 200 and the personal shopping cognitive assistant agent 300 from the cloud agent registry 150 into the entity agent registry 130.

In block 504, the personal cognitive agent 140 automatically configures the one or more selected cognitive assistant agents using configuration information 142. The configuration information 142 may include personal information (such as location), social relationships, preferences, etc. This is used to customize each cognitive assistant agent for the entity. For example, the personal cognitive agent 140 may automatically configure the personal banking cognitive assistant agent 200 with locations of one or more banks, bank account information, etc. As another example, the personal cognitive agent 140 may automatically configure the personal shopping cognitive assistant agent 300 with preferences for brands of apparel and electronics, particular retailers, apparel sizes, etc.

In block 506, the personal cognitive agent 140, for each of the one or more selected cognitive assistant agents, uses the cognitive assistant agent's manifest file to identify one or more embodied cognition object instances. For example, for the personal banking cognitive assistant agent, the banking agent manifest file 230 is used to identify the personal banking embodied cognition object instances 220 of: speaker, smart phone, robot, smart car, and optionally others. As another example, for the personal shopping cognitive assistant agent 300, the shopping agent manifest file 330 is used to identify the personal shopping embodied cognition object instances 320 of: speaker, smart phone, robot, smart car, and optionally others.

In block 508, the personal cognitive agent 140 downloads the identified one or more embodied cognition object instances from the cognitive assistant agent to the embodied cognition object instance registry. For example, for the personal banking cognitive assistant agent, the personal cognitive agent 140 downloads the personal banking embodied cognition object instances 220 of: speaker, smart phone, robot, smart car, and optionally others. As another example, for the personal shopping cognitive assistant agent 300, the personal cognitive agent 140 downloads the personal shopping embodied cognition object instances 320 of: speaker, smart phone, robot, smart car, and optionally others.

In block 510, the personal cognitive agent 140, for each of the one or more identified embodied cognition object instances, configures one or more cognitive capabilities. For example, for a personal banking cognitive assistant agent 200, the speaker embodied cognition object is given the cognitive capability of speech, while the smart phone embodied cognition object is given the cognitive capability of speech, location, and temporal. Similarly, for the personal shopping cognitive assistant agent 300, the speaker embodied cognition object is given the cognitive capability of speech, while the smart phone embodied cognition object is given the cognitive capability of speech, location, and audio.

In block 512, the personal cognitive agent 140, for each of the one or more identified embodied cognition object instances, loads an embodied cognition kernel to that embodied object instance. In block 514, the personal cognitive agent 140, for each of the one or more identified embodied cognition object instances, downloads one or more cognitive modules into the loaded cognition kernel.

Figure 6:
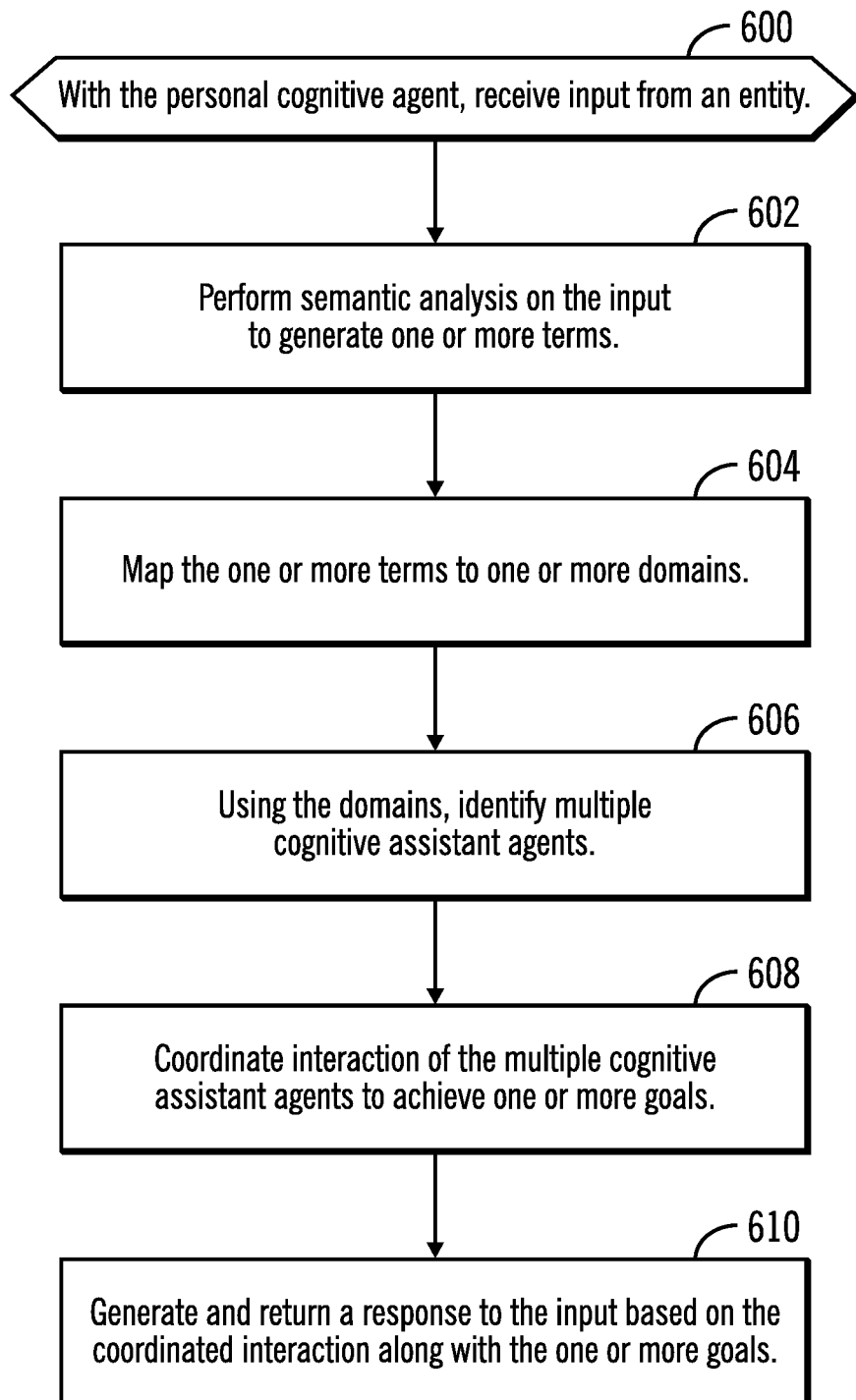
FIG. 6 illustrates, in a flowchart, operations for coordinating interaction of multiple cognitive assistant agents in accordance with certain embodiments.

FIG. 6 illustrates, in a flowchart, operations for coordinating interaction of multiple cognitive assistant agents in accordance with certain embodiments. Control begins at block 600 with the personal cognitive agent 140 receiving input from an entity.

For example, the entity states "I want to buy a sweater".

In block 602, the personal cognitive agent 140 performs semantic analysis on the input to generate one or more terms. For example, "sweater" is mapped to "apparel", while "buy" is mapped to "money". With embodiments, many items may map to "apparel" (e.g., pants, tops, jackets, etc.). Similarly, many words may map to "money" (e.g., purchase, sell, etc.).

In block 604, the personal cognitive agent 140 maps the one or more terms to one or more domains. For example, "apparel" is mapped to "shopping" and "money" is mapped to "banking".

In block 606, using the domains, the personal cognitive agent 140 identifies multiple cognitive assistant agents. For example, the personal cognitive agent 140 identifies the personal banking cognitive assistant agent 200 for the domain of banking and identifies the personal shopping cognitive assistant agent 300 for the domain of shopping.

In block 608, the personal cognitive agent 140 coordinates interaction of the multiple cognitive assistant agents to achieve one or more goals 144. For example, the coordination may include message exchanges between the personal cognitive agent 140, the personal banking cognitive assistant agent 200, and the personal shopping cognitive assistant agent 300. In particular, for purchase of a sweater, for a goal of paying a loan first, the personal cognitive agent 140 may message with the personal banking cognitive assistant agent 200 to obtain an indication of a budget of $100 for the sweater. In particular, the personal banking cognitive assistant agent 200 may determine the budget of $100 based on the goal of paying the loan first and the amount available in the bank account, taking into account whether other expenses (e.g., rent and groceries) have already been paid. Then, the personal cognitive agent 140 messages with the personal shopping cognitive assistant agent 300 to indicate that the sweater to be purchased may be at most $100 and receives a list of possible sweaters form the personal shopping cognitive assistant agent 300. The personal shopping cognitive assistant agent 300 is configured with configuration information 142 specific to the entity, and this may include sizing for apparel and shops that are preferred by the entity. The personal shopping cognitive assistant agent 300 is able to use this information to identify possible sweaters with, for example, internet searches.

In block 610, the personal cognitive agent 140 generates a response to the input based on the coordinated interaction along with the one or more goals. For example, the personal cognitive agent 140 generates a response with the list of possible sweaters, the budget of $100, and the goal of paying the loan first.

Figure 7:
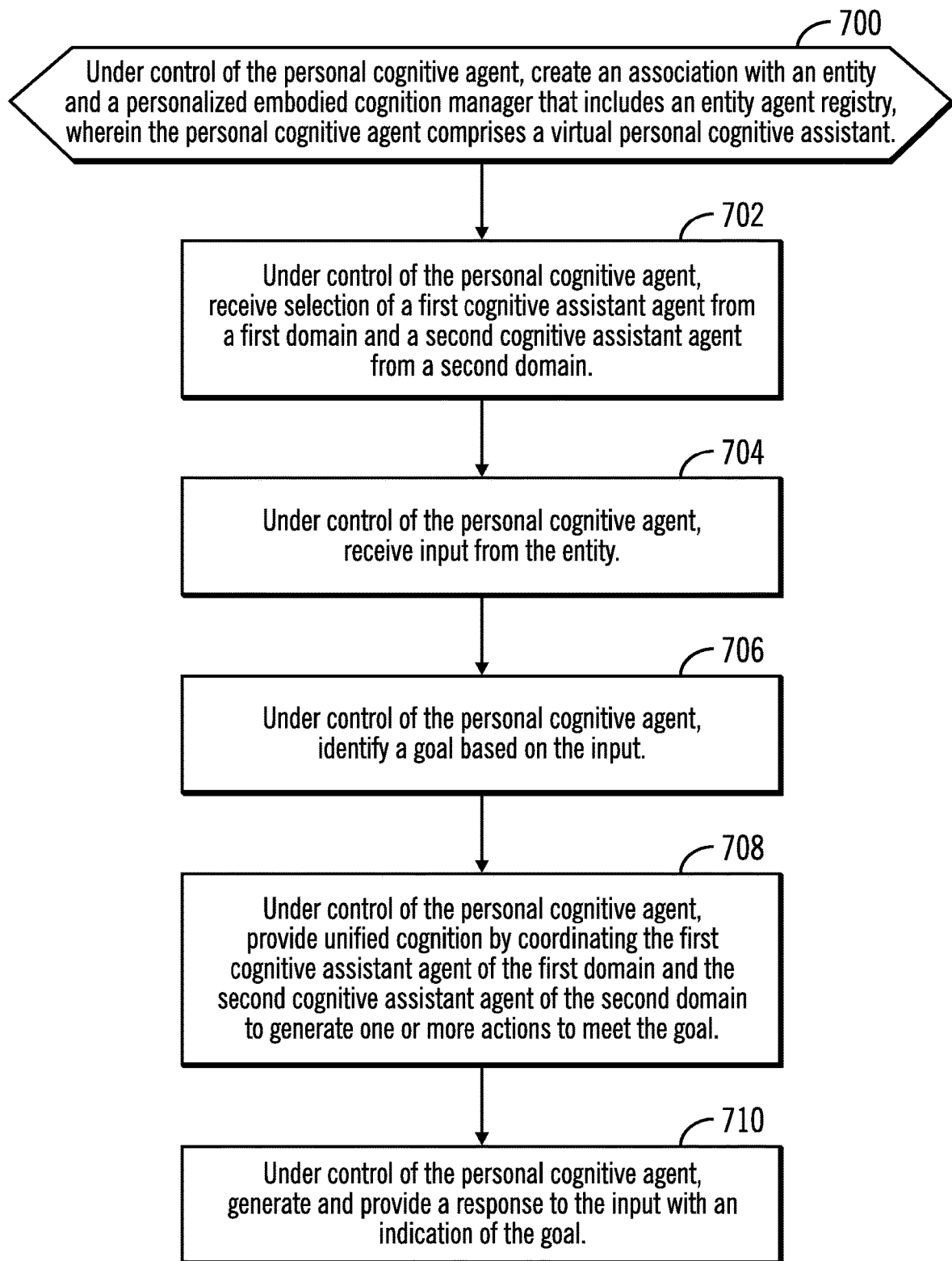
FIG. 7 illustrates, in a flowchart, operations for providing unified cognition for a cognitive assistant in accordance with certain embodiments.

FIG. 7 illustrates, in a flowchart, operations for providing unified cognition for a cognitive assistant in accordance with certain embodiments. Control begins at block 700 with a personal cognitive agent creating an association with an entity and a personalized embodied cognition manager that includes an entity agent registry, wherein the personal cognitive agent comprises a virtual personal cognitive assistant. In block 702, the personal cognitive agent, receives selection of a first cognitive assistant agent from a first domain and a second cognitive assistant agent from a second domain. In block 704, the personal cognitive agent, receives input from the entity. In block 706, the personal cognitive agent, identifies a goal based on the input. In block 708, the personal cognitive agent, provides unified cognition by coordinating the first cognitive assistant agent of the first domain and the second cognitive assistant agent of the second domain to generate one or more actions to meet the goal. In block 710, the personal cognitive agent, provides a response to the input with an indication of the goal.

Unified Cognition for a Virtual Personal Cognitive Assistant When Cognition is Embodied Across Multiple Embodied Cognition Object Instances and an Entity is Able to Interact With the Virtual Personal Cognitive Assistant Using the Multiple Embodied Cognition Object Instances Embodiments allow embodied cognition to serve a designated individual for services of augmented intelligence, as in virtual personal cognitive assistants. Embodied cognition is a core component in building such virtual personal cognitive assistants. A virtual personal cognitive assistant is highly personalized to an entity.

Embodiments enable entities who adopt a virtual personal cognitive assistant as an augmented intelligence to use more than one IoT device.

Embodiments provide individualized and personalized services from the embodied cognition. Embodiments enable the embodied cognition to talk to an entity with personalized/individualized design. Embodiments provide an association between a given embodied cognition object instance and a designated ownership by an entity identity (e.g., the entity identity is the boss and the embodied cognition object is the assistant).

Embodiments provide association of multiple embodied cognition object instances of different embodied cognition object instance types with one designated entity identity. Embodiments provide an inter-operating framework across these multiple embodied cognition object instances in producing a cohesive, unified cognition to serve one designated entity identity. For example, a personal cognitive shopping assistant working for a shopper as an individual includes: 1) secured interactions with a designated shopper, and 2) multiple embodied cognition object instances (e.g., a smart speaker in a home, a smart car as the shopper may be on the road driving, a smart phone as the shopper may be outside of a home, etc.). Continuing with the example, the smart speaker, the smart car and the smart phone become embodied cognition object instances, working in a cohesive, unified manner in serving a shopper who has a designated entity identity. With embodiments, cognitive assistance for shopping is provided to the entity by the cognitive system through multiple embodied cognition object instances, dynamically relevant to the situational context of the entity as an individual.

Embodiments enable multiple embodied cognition object instances of diversified embodied cognition object instance types, with embodied cognition object instance type having diversified embodied cognitive capabilities, dedicated to work with or assist, a single, designated entity identity, where the embodied cognition object instances may interoperate in a manner that is perceived by the entity as unified. This provides a cohesive personalized cognitive assistance experience, providing unified cognition for that entity identity.

Embodiments enable cognition everywhere. In particular, multiple embodied cognition object instances enable pervasive, ubiquitous, everywhere augmented intelligence for an entity as an individual. For example, a shopper may consume cognitive assistance from the home via the speaker as an embodied cognition object instance, or in the car on the road with the smart car as the embodied cognition object instance, etc.

Embodiments enable maximum leverage of cognitive capabilities in providing personal cognitive assistance. For example, the location and temporal cognition of a smart car as an embodied cognition object instance is enabled to know the favorite store location and shopping time of an entity that the virtual personal cognitive assistant is serving (i.e. the shopper) that only a speaker sitting at home with only speech cognitive capability, does not provide.

With embodiments, once an entity identity is designated, when an embodied cognition object instance is designated to a specific entity identity, learning and adaptation for that one entity as an individual is made possible.

Embodiments are agile and allow additional and removal of embodied cognition object instances for an entity. Different types of embodied cognition object instances with diversified cognitive capabilities may now be systematically and agilely added/removed for the entity at different points in time. For example, a speaker as an embodied cognition object instance has the cognitive capability for speech but not vision, while a robot as an embodied cognition object instance has much more cognitive capability. Such embodied cognition object instances of different embodied cognition object instance types, with different cognitive abilities, may be systematically added for the assistance of the entity.

Moreover, embodiments enable multi-modal entity interactions (e.g., hearing, movement, vision, gesture, etc.). Thus, unlike conventional systems that focus on speech (dialog or conversation between the embodied cognition object instances and the entity), embodiments enable embodied cognition object instances to be used for speech, hearing, vision, etc.

With embodiments, the personal cognitive assistant is able to "see", "hear", "move", "act", etc. For example, a conventional cognitive assistant may have a patient-buddy bot for a patient in a hospital (for patient experience transformation and augmented help for patient care). The bot is typically one device with one ability, speech via a speaker (using cognitive services of "dialog"). The following is an example in which the patient talks to the bot via the speaker:

Patient: "what time does the cafeteria close today?"
BOT: "5:30 p.m., 2 hours from now."
Patient: "Please turn the room temperature down."
BOT: "certainly" (and the bot issues a command on the device for temperature control).

However, with embodiments, there may be two devices of embodied cognition: #1 speaker and #2 movement detector for the patient to ensure patient does not get off bed. In this example, the vital signs monitoring alarm is set off. The bot, via the sound recognition cognitive API establishes 70% confident that the sound is the alarm of the patient's vital sign together with the kinetics services, establishes 60% the patient is struggling to get out of bed, and states:

BOT: "Please stay in your bed. I have called a nurse to come in to serve you."

Figure 8:
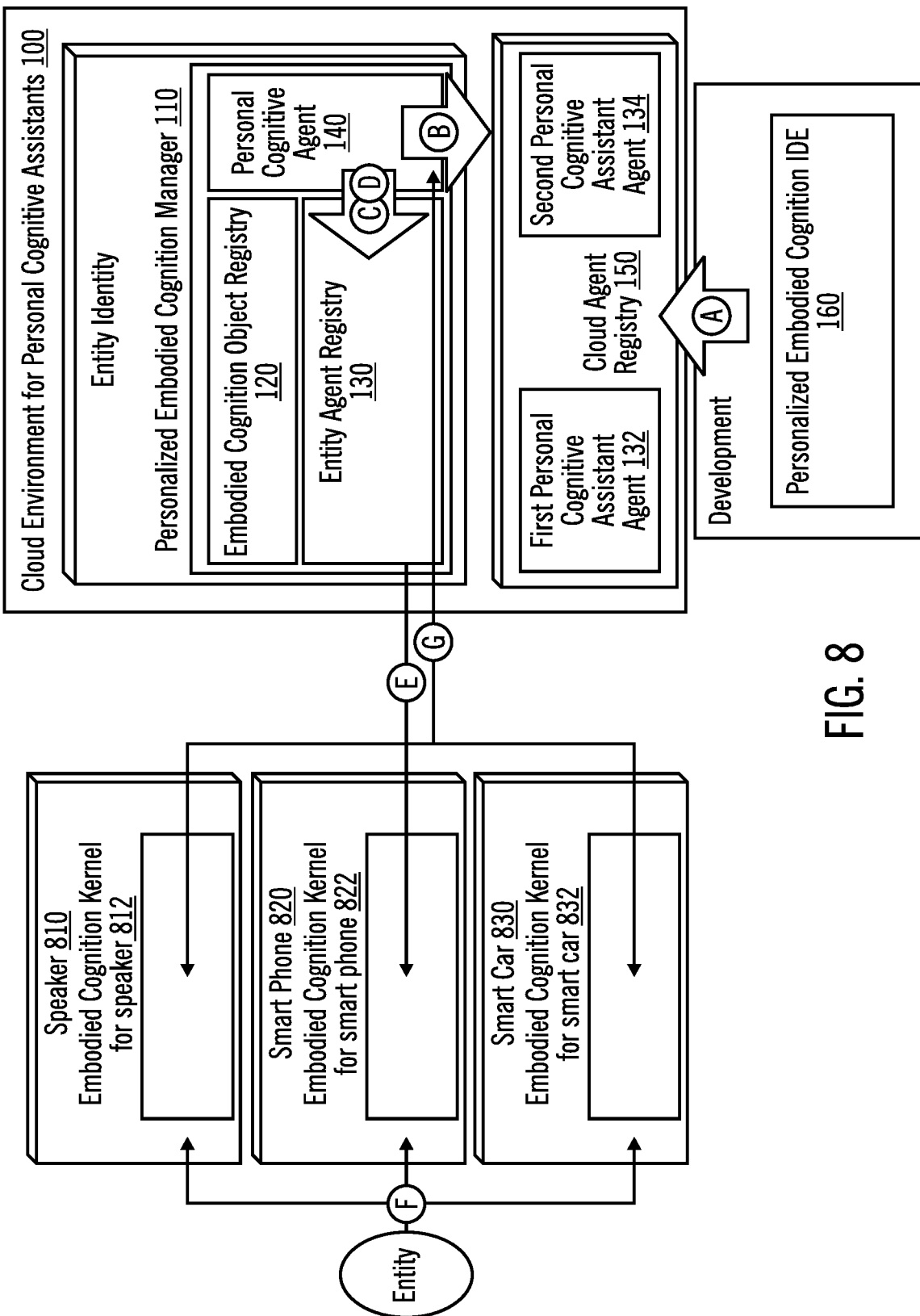
FIG. 8 illustrates, in a block diagram, a computing environment for providing unified cognition for a virtual personal cognitive assistant when cognition is embodied across multiple embodied cognition object instances and an entity is able to interact with the virtual personal cognitive assistant using the multiple embodied cognition object instances in accordance with certain embodiments.

FIG. 8 illustrates, in a block diagram, a computing environment for providing unified cognition for a virtual personal cognitive assistant when cognition is embodied across multiple embodied cognition object instances and an entity is able to interact with the virtual personal cognitive assistant using the multiple embodied cognition object instances in accordance with certain embodiments.

The personalized embodied cognition manager 110 works on the entity's behalf to manage multiple embodied cognition object instances and multiple uses of personal cognitive assistants. The entity's employment of embodied cognition object instances (e.g., IoT devices) is orthogonal to the entity's adoption of functions of cognitive assistants of different domains. The embodied cognition object instances are of diversified embodied cognition object instance types. With certain embodiments, different embodied cognition object instance types have different cognitive capabilities.

The personalized embodied cognition manager 110 includes an embodied cognition object instance registry 120 ("object instance registry" 120), an entity agent registry 130, and a personal cognitive agent 140. The object instance registry 120 includes objects, such as a speaker, a smart phone, a robot, a smart car, etc. Embodied cognition object instances may be added to or removed from the embodied cognition object instance registry 120. The entity agent registry 130 includes cognitive assistant agents for specific domains, such as a first personal cognitive assistant agent (e.g., for banking), a second personal cognitive assistant (e.g., for shopping), etc. Cognitive assistant agents may be added to or removed from the entity agent registry 130.

Each entity identity has a virtual personal cognitive assistant, referred to as the personal cognitive agent 140, which is managed by the personalized embodied cognition manager 110. The personal cognitive agent 140 provides unified cognition from across multiple assistant objects of cognition instances that the entity employs and registers in the embodied cognition object instance registry 120.

When a given set of cognitive capabilities (e.g., speech and vision) are being embodied into multiple embodied cognition object instances (e.g., both the speaker and the smart phone), unified cognition for the personal cognitive agent 140 means that cognitive capabilities (e.g., speech and vision), interacting with the entity and the world in independent time and space (e.g., via the speaker at home and the smart phone outside of the home), are being unified into one cognitive whole for the entity as a personal cognitive agent 140. The personal cognitive agent 140 provides one unified cognition by integrating cognitive services distributed in multiple embodied cognition object instances. Different embodied cognition object instances may have different embodied cognition object instance types. With embodiments, not every embodied cognition object instance may embody all cognitive capabilities. For example, some cognitive capabilities may not be fit for a certain type of embodied cognition object instance. For example, vision is a cognitive capability that is not a fit for a speaker. Embodiments are able to manage these different types of embodied cognition object instances with different sets of cognitive capabilities.

With embodiments the personal cognitive agent 140 provides unified cognition and integrates cognitive interactions with and services from multiple embodied cognition object instances with cognitive capabilities of cognitive assistance being modularized into cognitive assistant agents of the entity agent registry 130 and with cognitive capabilities of a cognitive model of a given cognitive assistant agent being modularized into cognitive modules.

As a first example, the personal cognitive agent 140 consolidates entity interactions of one given cognitive capability (e.g., speech) across multiple e embodied cognition object instances for a given cognitive assistant agent. For example: in a personal shopping cognitive assistant agent having the cognitive ability of speech, the personal cognitive agent 140 consolidates: a home speaker (June 15) (that hears: if sirloin steak is less than $30 a pound, buy 3 pounds) with a smart phone in the super market (June 16) (that understands that milk will expire in three days) with a smart car on the road (June 17) (that understands: don't forget to pick up veggies and fruit). Other cognitive capabilities to be consolidated from multiple embodied cognition object instances of interaction for a given cognitive assistant agent include: visions, audio, kinetics etc.

As a second example, the personal cognitive agent 140 consolidates entity interactions of multiple cognitive capabilities across multiple e embodied cognition object instances for the same cognitive assistant agent. For example, the entity's location module and temporal module are integrated with the speech module for the entities personal cognitive agent 140 and the personal shopping cognitive assistant agent 300 indicates: "there is a store near you to pick up these items before your next meeting".

For the agent programming model, embodiments augment a model-view-controller (MVC) architectural pattern to harvest the architectural benefits and merits of the agent programming model. This enables creation of a personal cognitive agent 140 that may be customized for each different entity by adding different cognitive assistant agents from the cloud agent registry 150, which interact with the embodied cognition object instance registered in the embodied cognition object instance registry 120.

With certain embodiments, an embodied cognition kernel resides in the embodied cognition object instances. The embodied cognition kernel is a runtime container for the instantiation of cognitive modules of a particular function (e.g., banking, shopping, health, etc.) for that embodied cognition object instance type and downloads the cognitive capability fit for that embodied cognition object instance (e.g., the embodied cognition object instance "speaker" will not download the "vision" module of the cognitive assistant agent). In this example, there are embodied cognition object instances for speaker 810, smart phone 820, and smart car 820. In FIG. 8, the entity agent registry 130 is coupled to the speaker 810 with an embodied cognition kernel for a speaker 812, to the smart phone 820 with an embodied cognition kernel for a smart phone 822, and to the smart car 830 with an embodied cognition kernel for a smart car 832.

With certain embodiments, a cognitive assistant agent is a software module created by extending cognitive computing services (e.g., via the cloud environment), including machine learning services, to implement a set function scope with a specific domain, that provides personalized cognitive assistance to an entity.

With certain embodiments, the software structure to enable unified cognition for virtual personal cognitive assistants for cognition to be embodied across multiple embodied cognition object instances includes a model-instance-control architectural pattern for agent and object instances, (following the model-view-controller architectural pattern applied in user interfaces of applications).

With certain embodiments, each cognitive capability (e.g., speech, vision, location, temporal, etc.) has a separate cognitive model, for each type of personal cognitive assistant agent, that is orthogonal to the embodied cognition object instances and the cognitive controller. Each cognitive capability is encapsulated in its corresponding cognitive module. Each cognitive module, as one of the elements of the model in the agent's programming model, implements the function, the flow, and the actions of the agent's functional scope.

Figure 14:
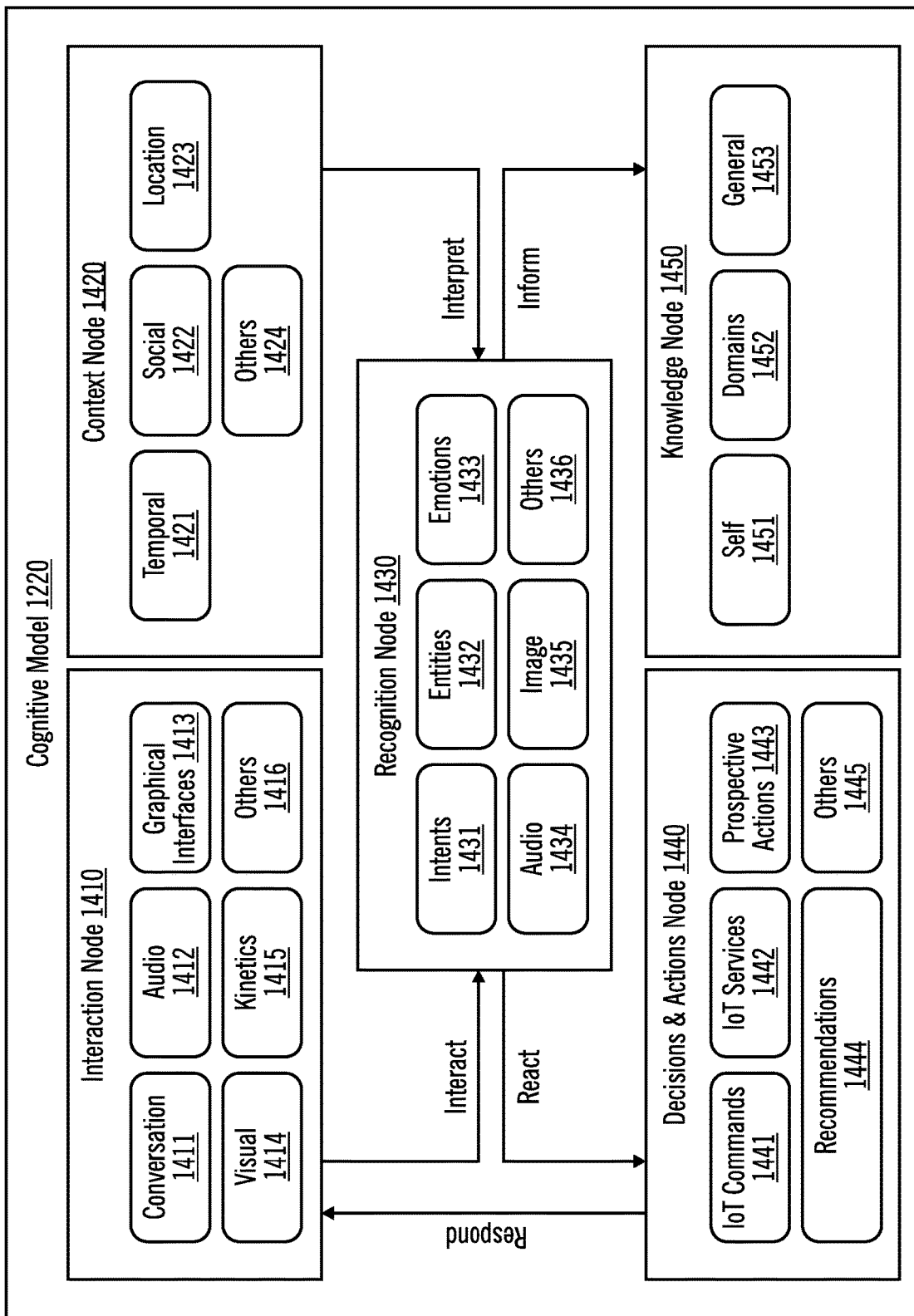
FIG. 14 illustrates further details of the cognitive classifier in accordance with certain embodiments.

The list of cognitive models (e.g., as illustrated in FIG. 14) per each cognitive capability are implemented as cognitive modules and include, but are not limited to the following:

A. knowledge (knowledge and memory for self, knowledge and memory for agent domain, general knowledge, etc.);

B. interaction (conversation services, vision services, audio services, kinetic services, graphical interface services, etc.);

C. recognition (speech recognition, vision recognition, audio recognition, emotion recognition, intention recognition (e.g., goals, plans, pre-conditions, post-conditions, etc.), entity recognition, image recognition, etc.);

D. decisions and actions (commands (e.g., pre-conditions, post conditions, etc.), micro services (e.g., pre-conditions, post conditions, etc.), recommendations, prospective actions, IoT commands, IoT services, etc.); and E. context (temporal context, location context, social context, etc.).

Each cognitive module is optional. However, each cognitive assistant agent has at least one cognitive module.

Each embodied cognition object (e.g., speaker, smart phone, robot, smart car, etc.) may have at least one or more object instances (e.g., speaker, smart phone, robot, smart car, etc.). For example, a speaker as an embodied cognition object instance may instantiate the speech cognitive module, while a smart phone as an embodied cognition object instance may instantiate the speech cognitive module, the location cognitive module, the vision recognition cognitive module, etc.

Each cognitive assistant agent has an agent manifest file (i.e., a meta data file) that is generated from the personalized embodied cognition IDE. The agent manifest file maintains a list of cognitive modules for the set function scope of the corresponding cognitive assistant agent (e.g., personal shopping cognitive assistant agent 300) and a list of object instance implementations. For example, the personal shopping cognitive assistant agent 300 may have the following cognitive modules implemented: 1) a speech module for multiple agent-features (e.g., replenishment; ordering, etc.), 2) a visual module for multiple agent-features (e.g., product identification, product expiration date recognition, etc.), 3) a temporal module for multiple agent-features (e.g., expiring date tracker; coupon period tracker, etc.), and 4) a location module for multiple agent-features (e.g., nearest store to shopper's current location, etc.

The list of embodied cognition object instances may contain the following: a speaker instance of speech modules for the shopping agent, and a smart phone instance of speech, visual, location cognitive modules. Initially, a robot instance may be empty, but when the robot instance is added, the agent manifest file is updated.

Referring to (A) of FIG. 8, initially a software developer uses the personalized embodied cognition IDE 160 to create a cognitive assistant agent and deposits the cognitive assistant agent to the cloud agent registry 150 of the cloud environment for personal cognitive assistants 100. With embodiments, the developer follows the IDEs of an agent and agent framework to create cognitive modules relevant for the function scope of the cognitive assistant agent (agnostic to any embodied cognition object instance). For each embodied cognition object instance, the developer creates an object instantiation by extending the cognitive modules that the embodied cognition object instance supports in order to create the cognitive assistant agent. The developer then publishes the finished cognitive assistant agent in the cloud agent registry 150 of the cloud environment for personal cognitive assistants 100.

Referring to (B) of FIG. 8, an entity logs in to the loud environment for personal cognitive assistants 100 to access the personal embodied cognition manager 110. Through the personal cognitive agent 140, the entity sees which agents are available from the cloud agent registry 150 of the cloud environment for personal cognitive assistants 100.

Referring to (C) of FIG. 8, the entity selects a specific agent (e.g., a personal shopping cognitive assistant agent) to download from the cloud agent registry 150 into the entity agent registry 130.

Referring to (D) of FIG. 8, personal cognitive agent 140 automatically configures the selected agent (e.g., the personal shopping cognitive assistant agent) according to the knowledge (memory) of the entity (e.g., personal information, such as location, social relationships; preferences, etc.).

Referring to (E) of FIG. 8, the personal cognitive agent 140 automatically sets up the cognitive capabilities for each embodied cognition object instance that the entity has registered in the embodied cognition object instance registry 120. For each registered embodied cognition object instance, the personal cognitive agent 140 looks at the agent manifest file to locate the embodied cognition object instance of each cognitive module of the cognitive assistant agent for that embodied cognition object instance. The personal cognitive agent 140 downloads and sets up, per each embodied cognition object instance in the embodied cognition object instance registry 120, by loading the corresponding object instantiation of each cognitive module, to the embodied cognition kernel.

Referring to (F) of FIG. 8, the entity continues to interact with the cognitive assistant agent (e.g., the personal shopping cognitive assistant agent) through multiple embodied cognition object instances (e.g., a speaker at home, a smart phone on the go, a smart car on the road, etc.).

Referring to (G) of FIG. 8, for each cognitive module of the same cognitive capability (e.g., speech) across multiple embodied cognition object instances, the personal shopping cognitive assistant agent aggregates into one unified cognition of that cognitive capability.

Figure 9:
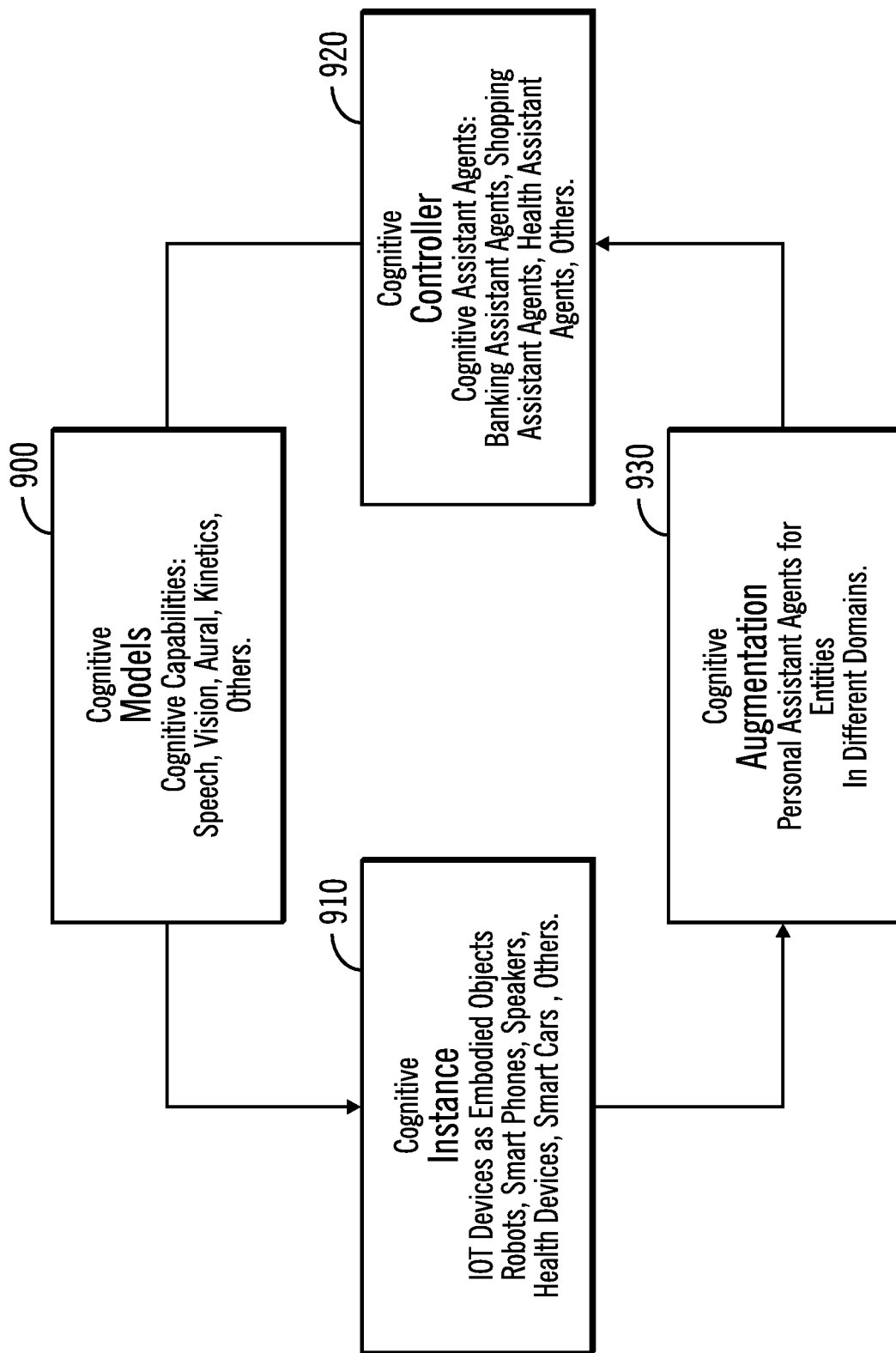
FIG. 9 illustrates an architectural pattern accordance with certain embodiments.

FIG. 9 illustrates an architectural pattern accordance with certain embodiments. In FIG. 9, cognitive models 900 (e.g., a personal banking cognitive model taking the form of personal banking cognitive assistant agent 200 or a personal shopping cognitive model taking the form of personal shopping cognitive assistant agent 300) with cognitive capabilities are used to generate cognitive instances 910 (embodied cognition object instances in the embodied cognition object instance registry 120) and cognitive controllers 920 (cognitive assistant agents 132, 134 in the entity agent registry 130). Also, the cognitive augmentations 930 (personal cognitive agents) control the cognitive assistant agents.

Figure 10:
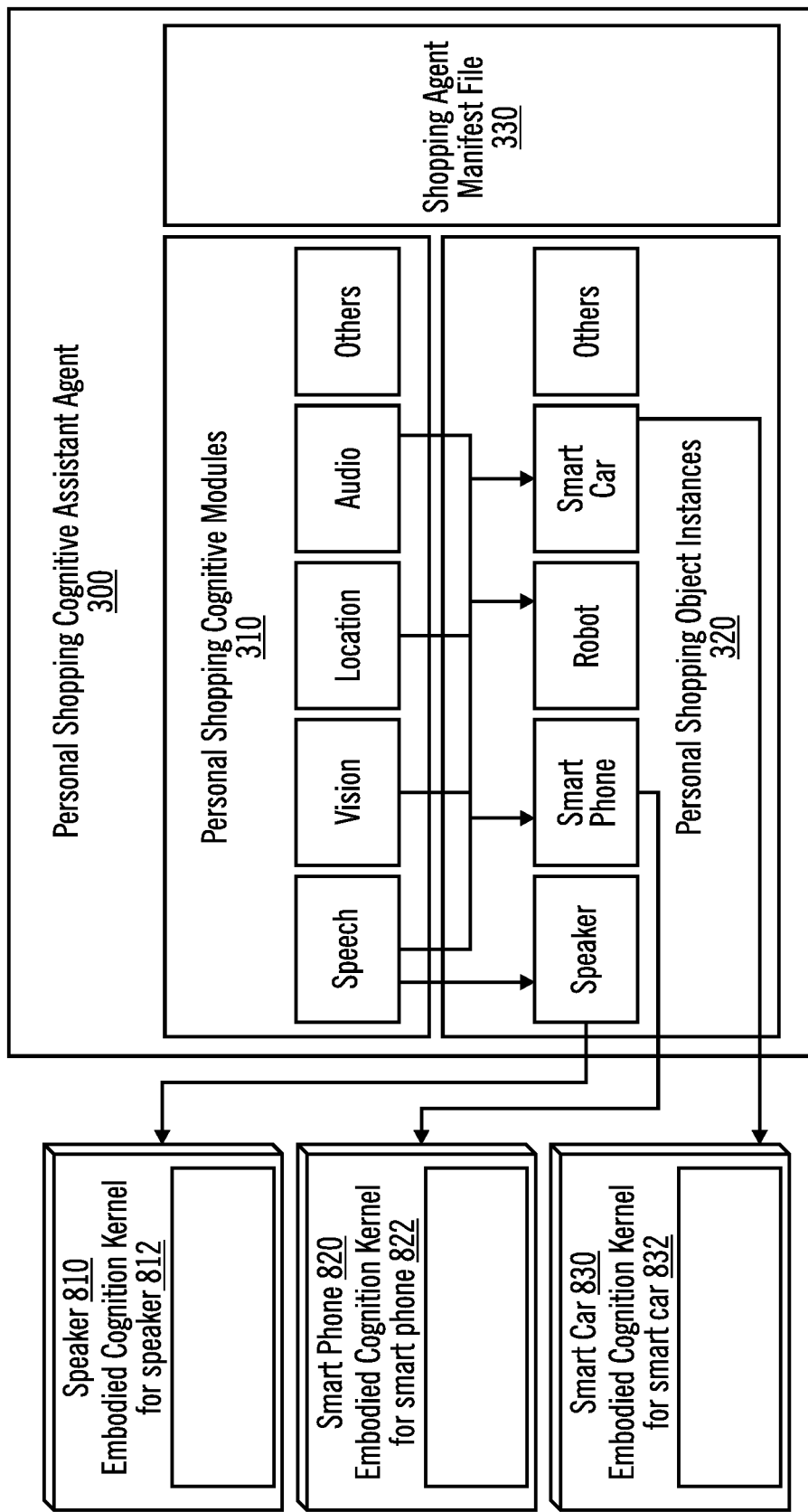
FIG. 10 illustrates interaction of embodied cognition kernels and embodied cognition object instances in accordance with certain embodiments.

FIG. 10 illustrates interaction of embodied cognition kernels and embodied cognition object instances in accordance with certain embodiments. In this example, there are embodied cognition object instances for speaker 810, smart phone 820, and smart car 820. The persona shopping cognitive modules 310 are downloaded into the cognition kernels. For example, for the speaker 810, the speech cognitive module is downloaded into the embodied cognition kernel for speaker 812; for the smart phone 820, the speech, vision, location, and audio cognitive modules are downloaded into the embodied cognition kernel for smart phone 822; and, for the smart car 830, the speech, vision, location, and audio cognitive modules are downloaded into the embodied cognition kernel for smart car 832.

Figure 11:
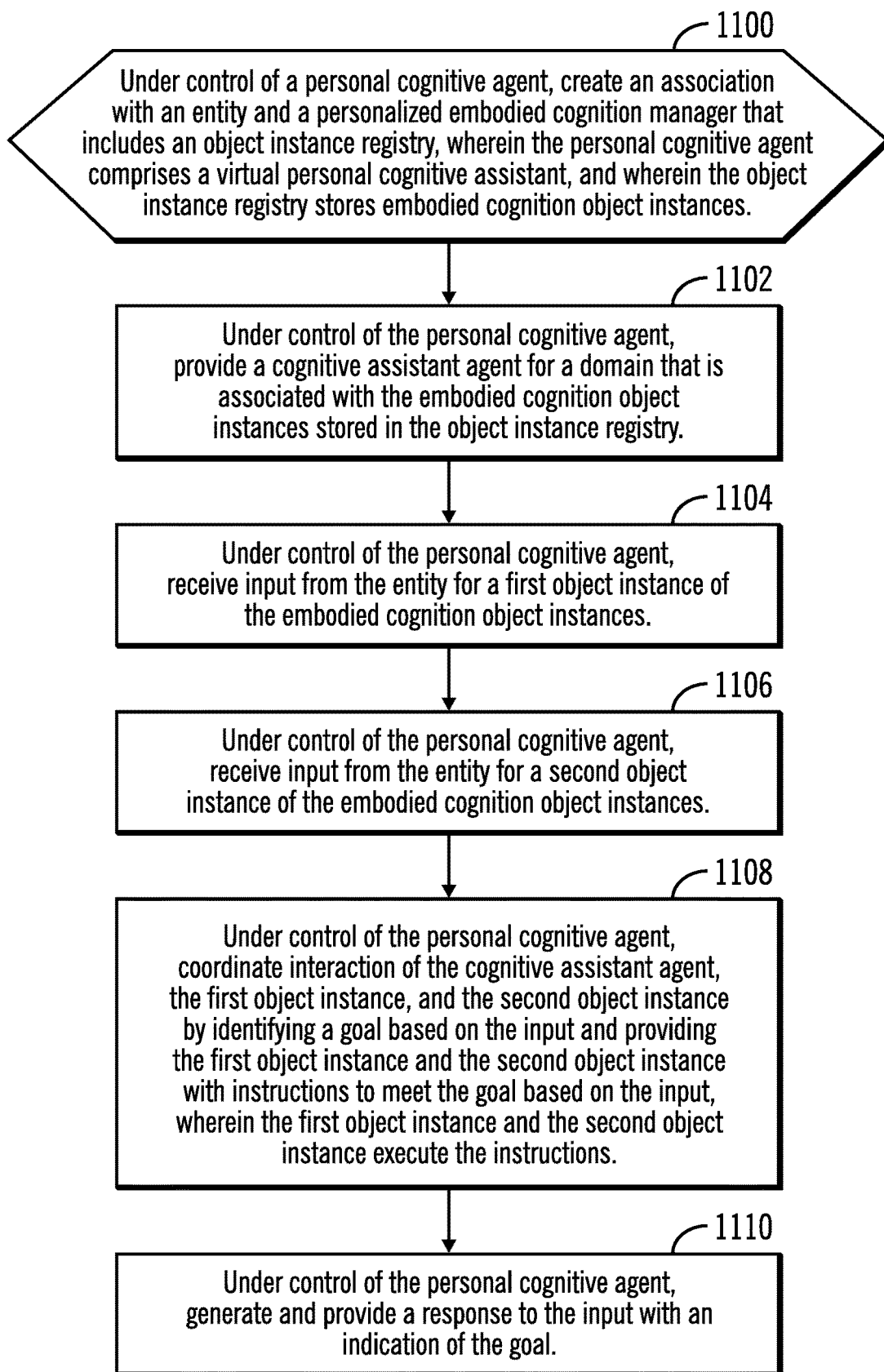
FIG. 11 illustrates, in a flowchart, operations for providing unified cognition for a virtual personal cognitive assistant when cognition is embodied across multiple embodied cognition object instances and an entity is able to interact with the virtual personal cognitive assistant using the multiple embodied cognition object instances in accordance with certain embodiments.

FIG. 11 illustrates, in a flowchart, operations for providing unified cognition for a virtual personal cognitive assistant when cognition is embodied across multiple embodied cognition object instances and an entity is able to interact with the virtual personal cognitive assistant using the multiple embodied cognition object instances in accordance with certain embodiments. Control begins at block 1100 with the personal cognitive agent 140 creating an association with an entity and a personalized embodied cognition manager that includes an object instance registry, wherein the personal cognitive agent comprises a virtual personal cognitive assistant, and wherein the object instance registry 120 stores embodied cognition object instances.

In block 1102, the personal cognitive agent 140 provides a cognitive assistant agent for a domain that is associated with the embodied cognition object instances stored in the object instance registry 120.

In block 1104, the personal cognitive agent 140 receives input from the entity for a first object instance of the embodied cognition object instances. In block 1106, the personal cognitive agent 140 receives input from the entity for a second object instance of the embodied cognition object instances. For example, the first object instance may be a speaker in a house, which receives input of "I want to buy a sweater", while the second object instance may be a smart car that receives an input of "I want to go shopping".

In block 1108, the personal cognitive agent 140 coordinates interaction of the cognitive assistant agent, the first object instance, and the second object instance by identifying a goal based on the inputs and providing the first object instance and the second object instance with instructions to meet the goal based on the input, wherein the first object instance and the second object instance execute the instructions. For example, the personal cognitive agent 140 may identify a goal of "spend no more than $100 for apparel". Then, the personal cognitive agent 140, through the cognitive assistant agent, may instruct the speaker to identify possible sweaters for purchase for under $100, and the personal cognitive agent 140, through the cognitive assistant agent, may instruct the smart car to drive to a sweater store.

In block 1110, the personal cognitive agent 140 generates and provides a response to the input with an indication of the goal. For example, the personal cognitive agent 140 may provide a list of possible sweaters and sweater stores along with the goal of "spend no more than $100 for apparel".

Thus, embodiments provide unified cognition for a virtual personal cognitive assistant of an entity when cognition is embodied across multiple embodied cognition object instances. This includes creating a cognitive assistant agent using a personalized embodied cognition IDE, where the cognitive assistant agent follows an agent and agent framework of the personalized embodied cognition IDE and includes cognitive modules relevant for a function scope of a respective agent agnostic to any object instance. Also, to create the cognitive assistant agent, for each object instance, the object instantiation is created by extending cognitive modules that an object supports. The cognitive assistant agent is stored into a cloud agent registry 150 and is later downloaded into the entity agent registry 130.

In response to the entity logging-in to the cloud environment 100 and accessing a personalized embodied cognition manager 110, a personal cognitive agent 140 provides particular cognitive assistant agents available from the cloud agent registry. In response to a selection of a specific cognitive assistant agent by the entity, that cognitive assistant agent Is downloaded from the cloud agent registry 150 to the entity agent registry 130. the cognitive assistant agent is automatically configured according to personal information associated with the entity (e.g., location, social relationships, and preferences). A function of the specific cognitive assistant agent is automatically set per each object that the entity has registered in an embodied cognition object instance registry 120. For each registered object, the personal cognitive agent 140 uses an agent manifest file of the specific cognitive assistant agent to locate an object instance of each cognitive module of the specific cognitive assistant agent for that object instance. Then, embodiments, download and configure, for each embodied cognition object instance in the embodied cognition object instance registry 120 of the entity, by loading a corresponding object instantiation of each cognitive module, to an embodied cognition kernel of the embodied cognition object instance. Then, the entity interacts with the specific cognitive assistant agent through multiple embodied cognition object instances and aggregates, using the personal cognitive agent 140, each cognitive module of a same cognitive capability across multiple embodied cognition object instances into one unified cognition of a cognitive capability.

Thus, embodiments, incarnate one or multiple virtual personal cognitive assistants into multiple embodied cognition object instances of embodiments, for a given entity.

Multi-Dimensional Cognition for Unified Cognition in Cognitive Assistance

There are many cognitive services, which, independently, may be described as single cognitive dimension. For example, cognitive services, such as Natural Language Processing in speech (e.g., using classifiers of dialog and speech to recognize intent, entities, emotions, audio, images, etc.) may be independent of other services of different cognitive dimension, such as visual recognition (e.g., using classifiers of images to recognize entities) or services for the cognitive capability of sound (e.g., using classifiers of sound to recognize that "an alarm went off").

In certain embodiments, cognitive capabilities may be referred to as cognitive dimensions.

Unlike conventional implementations, embodiments enable different cognitive capabilities to work together. Thus, there is sharing of cognitive elements, such as knowledge with other cognitive capabilities (e.g., speech, vision, audio, and others). Enabling different cognitive capabilities to work together assists in solving real world problems to add significant value.

Embodiments provide augmented intelligence that brings value to entities with integration of what the cognitive system sees, hears, and knows. That is because human cognition is multi-dimensional.

Unlike robot solutions, in which all cognitive capabilities are physically in the same robot, embodiments integrate cognitive capabilities of different physical objects. For example, the cognition of recognizing anomalies typically requires multi-dimensional cognitive computing services that include seeing, hearing, and knowing, where. This allows for the visual recognition of "smoke" from images, the audio recognition of "alarm ringing" from sound, the signal of what an alarm trigger means, the speech and Natural Language Processing (NLP) recognition of picking up people yelling "Help" picked up from conversational services, and knowing the intent of signaling danger.

Figure 12:
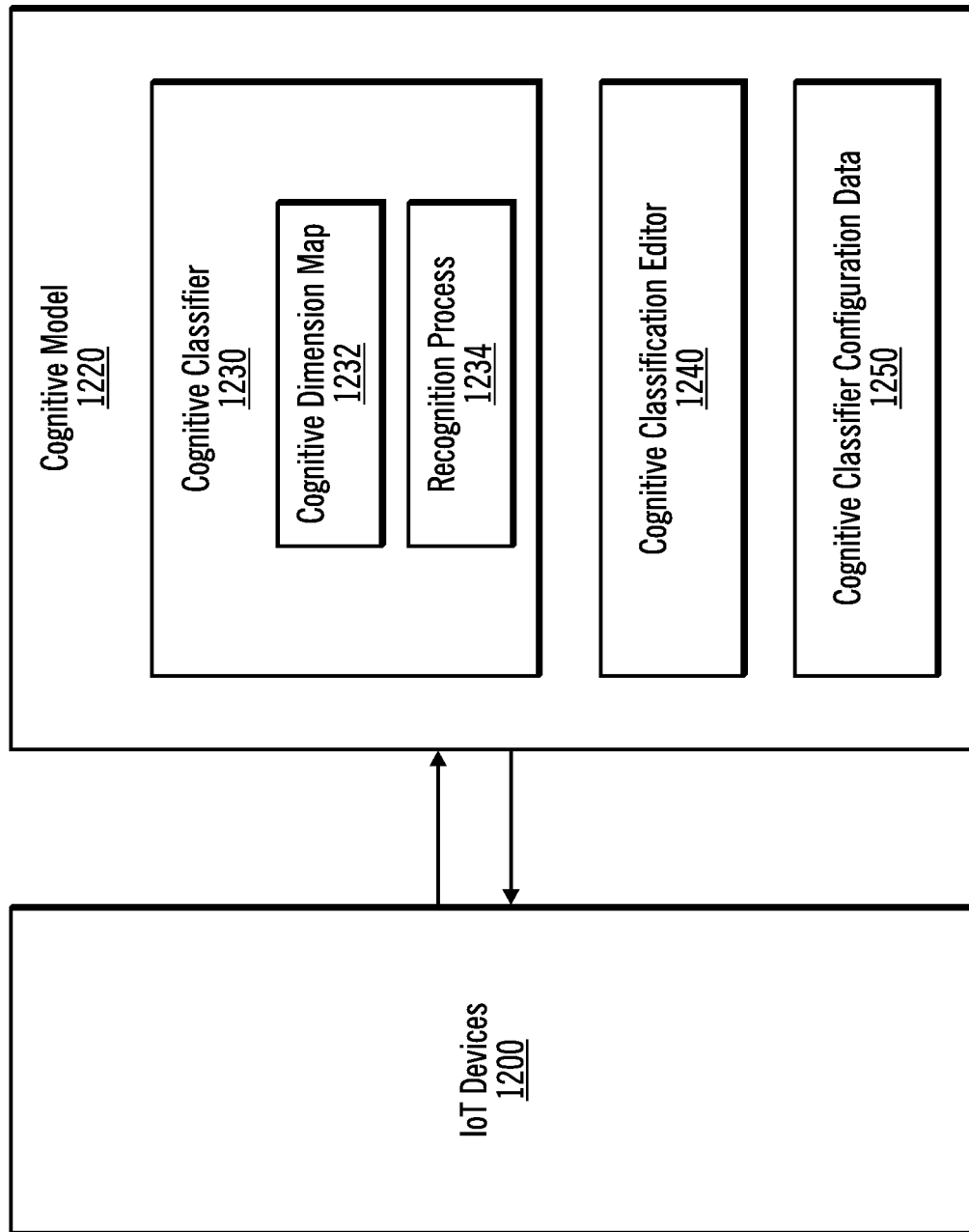
FIG. 12 illustrates interaction between Internet of Things (IoT) devices and a cognitive model in accordance with certain embodiments.

FIG. 12 illustrates interaction between IoT devices 1200 and a cognitive model 1220 in accordance with certain embodiments. The cognitive model 1220 includes a cognitive classifier 1220, a cognitive classification editor 1240, and cognitive classifier configuration data 1250. The cognitive classification editor 1240 may be used by developers to define the cognitive classifier 1230. The cognitive classifier 1230 includes a cognitive dimension map 1232 and a recognition process 1234. Then, the cognitive classifier 1230 receives information from the IoT devices to generate events and recommendations.

Figure 13:
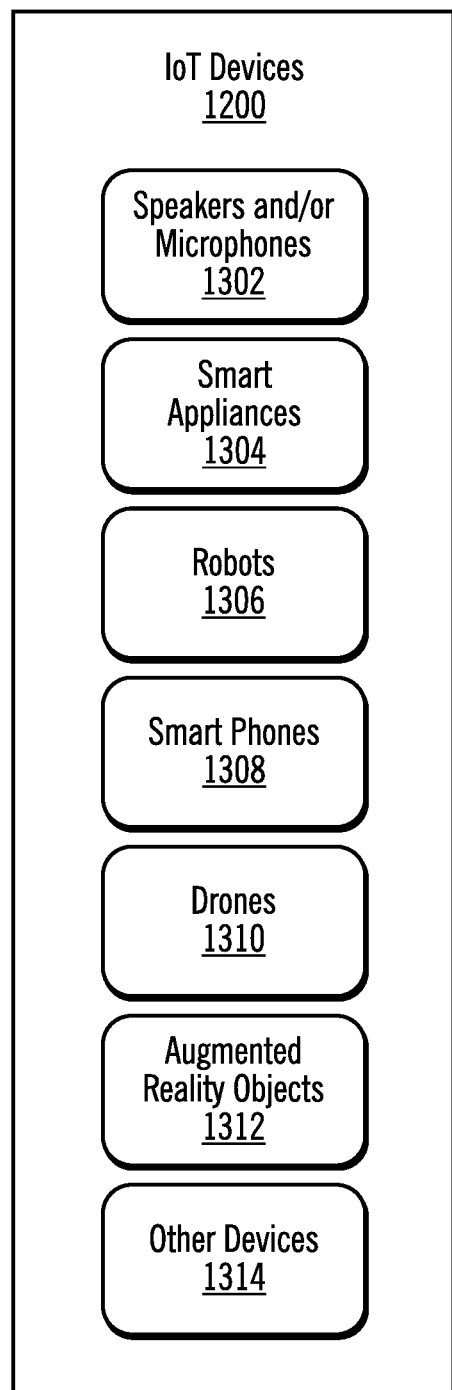
FIG. 13 illustrates further details of the IoT devices in accordance with certain embodiments.

FIG. 13 illustrates further details of the IoT devices in accordance with certain embodiments. In FIG. 13, the IoT devices include speakers and/or microphones 1302, smart appliances 1304, robots 1306, smart phones 1308, drones 1310, augmented reality (e.g., an image is modified to improve the image) objects 1312, and optionally other objects 1314.

FIG. 14 illustrates further details of the cognitive model 1220 in accordance with certain embodiments. The cognitive model 1220 includes an interaction node 1410, a context node 1420, a recognition node 1430, a decisions and actions node 1440, and a knowledge node 1450.

The interaction node 1410 includes services: conversation 1411, audio 1412, graphical interfaces 1413, visual 1414, kinetics 1415, and optionally others 1416.

The context node 1420 includes services: temporal 1421, social 1422, location 1423, and optionally others 1424.

The recognition node 1430 includes services: intents 1431, entities 1432, emotions 1433, audio 1434, image 1435, and optionally others 1436.

The decisions and actions node 1440 includes services: IoT device commands 1441, services 1442, prospective actions 1443, recommendations 1444, and optionally others 1445.

The knowledge node 1450 includes services: self-knowledge 1451, knowledge of different domains 1452, and general knowledge 1453.

In certain embodiments, a cognitive assistant agent may use the services available in the nodes 1410, 1420, 1430, 1440, 1450 of FIG. 4. For example, a fire detection cognitive assistant agent may use an audio service to listen for a fire alarm and to announce an alert about a fire, may use an IoT service 1442 to call the fire department.

Figure 15:
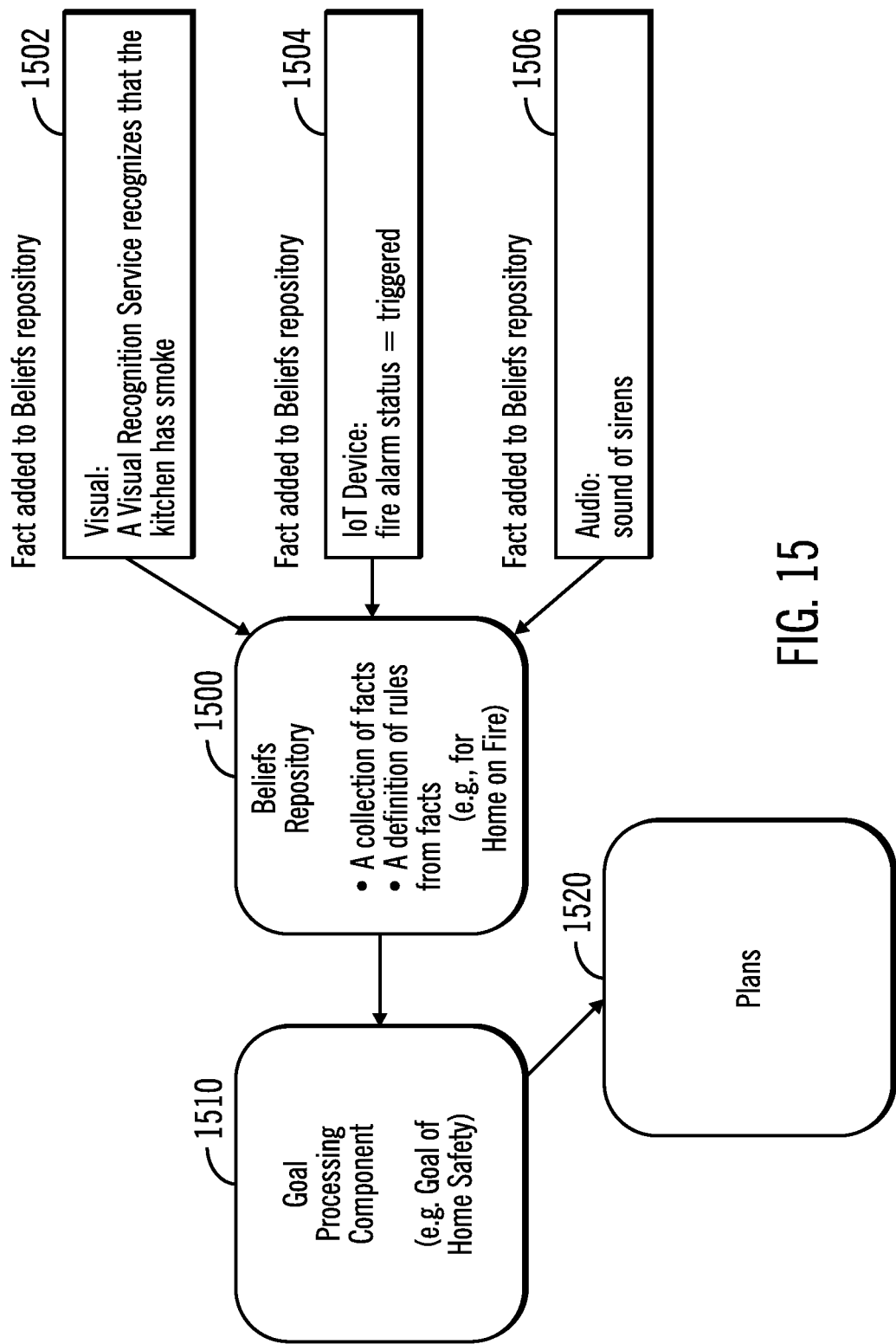
FIG. 15 illustrates a cognitive dimension map and a recognition process in accordance with certain embodiments.

FIG. 15 illustrates a cognitive dimension map and a recognition process in accordance with certain embodiments. The example of FIG. 15 is for home fire safety. FIG. 15 illustrates an example of a cognitive dimension map with services: visual 1502, IoT device 1504, and audio 1506 and a recognition process with elements 1500, 1510, and 1520. The beliefs repository 1500 includes a set of rules to establish recognition based on a set of facts. In this example, the facts come from visual 1502 (a visual recognition service recognizes that the kitchen has smoke), an IoT device (a fire alarm status has been triggered), and audio 1506 (sound of sirens). Based on these facts, with the goal of home safety, the personal cognitive agent 140 selects a plan of plans 1520. In this example, the plan is to re-establish home safety by notifying the fire department of a fire, notifying the home owner, notifying a security company, etc. The plans may be pre-set and customized.

Embodiments provide multi-dimensional cognition in providing unified cognition for cognitive assistance and augmented intelligence with a cognitive model 1220 that enumerates each cognitive dimension. The cognitive classifier 1230 includes a cognitive dimension map with a construct with entries for context nodes, interaction nodes, recognition nodes, knowledge nodes, and decision and action nodes. The entries of the cognitive service map may be referred to as entries for each cognitive service that will be used for the particular cognition service map. With embodiments, a recognition process provides a definition of how each cognitive service works with each other cognitive service listed in the cognitive dimension map to recognize what is set out in this cognitive model 1220. For example, how audio (a fire alarm) may work with visual (smoke) to detect that there is a fire so that the fire department is called.

The cognitive model 1220 serves the purpose of enumerating all cognitive capabilities participating in the cognitive system. The cognitive classifier 1230 names the subset of cognitive capabilities listed in the cognitive dimension map and defines how these cognitive capabilities work with each other.

The cognitive classifier 1230 has a classifier name, such as fire anomaly. The cognitive classifier 1230 has a cognitive dimension map, which is meta data that reference each cognitive service relevant to this cognitive classifier 1230. The recognition process captures how each cognitive service works with other cognitive services listed in the cognitive dimension map to recognize what is set out in this cognitive classifier 1230.

Each element in the cognitive model 1220 may be described as a palette in the cognition classification editor 1240. When the palette is selected, a list of pre-built cognitive services is presented for selection. The end user may also use the cognition classification editor 1240 to define new, customized cognitive dimension maps and recognition process (i.e., cognitive process flows).

For example, if a software developer wants to define a cognitive classifier 1230 for a smart home application, with fire detection as a classifier for the smart home user to use for days when the smart home owner is away from home (e.g., on vacation or travelling). Then, the name of the classifier may be "fire cognitive classifier", with a cognitive dimension map having entries for context nodes, interaction nodes, recognition nodes, knowledge nodes, and decision and action nodes.

The context node indicates: that the temporal service is set to "June 10 to June 24" (the days when the family are on vacation and no one is home), that the social service is set to "anyone in the family", and the location model is set to "home".

The interaction node indicates that: the audio service detects a fire alarm and the visual service detects smoke.

The recognition node indicates: audio of all alarm classifiers and visual recognition (e.g., smoke images).

The knowledge nodes include, for self-knowledge: knowledge of the home smoke detector (e.g., maintenance date, etc.), knowledge of contact when fire is triggered, and knowledge of all past fire alarm triggered.

The decision and actions node indicates: a list of services and commands ("services") (e.g., to notify a family member and to call 911).

The recognition process includes machine initiated recognition of smoke or machine initiated audio recognition of an alarm. If only one is recognized, connection with the home owner who is travelling is initiated. If both are recognized, calling for help (e.g., dialing 911) is initiated.

Thus, once the cognition classification editor 1240 is used to create the cognitive classifier 1230, for fire detection, then parameters are created for configuration by an entity (e.g., a home owner). Once the entity provides parameter values for the parameters, the cognitive classifier 1230 is deployed, which is cognitive system run time. The cognitive classifier 1230 processes classification meta data of and translates this meta data into published and subscribed events. Published events may be described as broadcasting a change, and subscribed events may be described as events that are subscribed to by the cognitive model 1220 (e.g., a cognitive model 1220 for fire safety may subscribe to events involving fire).

Figure 16:
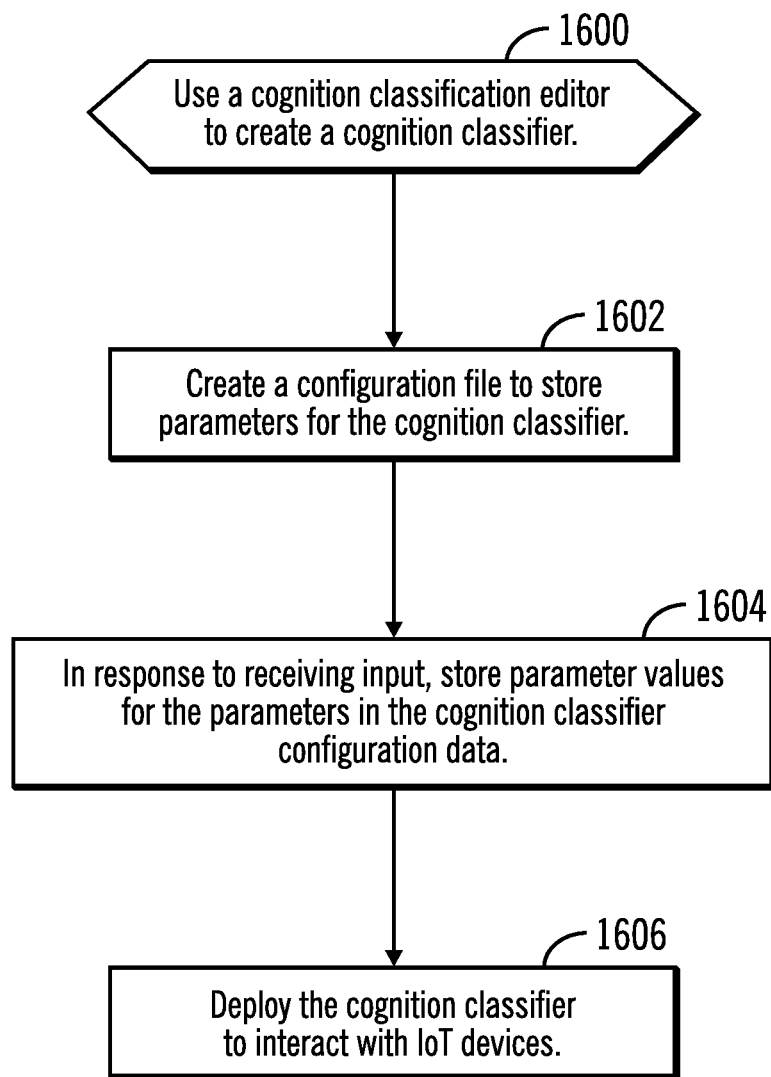
FIG. 16 illustrates, in a flowchart, operations for providing enabling multi-dimensional cognition for unified cognition in cognitive assistance.

FIG. 16 illustrates, in a flowchart, operations for providing enabling multi-dimensional cognition for unified cognition in cognitive assistance. Control begins at block 1600 with the cognition classification editor 1240 creating a cognitive classifier 1230. In block 1602, the cognition classification editor 1240 creates a configuration file to store parameters for the cognitive classifier 1230. In block 1604, in response to receiving input from the entity, the cognition classification editor 1240 stores parameter values for the parameters in the cognitive classifier configuration data 1250. In block 1606, the cognition classification editor 1240 deploys the cognitive classifier 1230 to interact with the IoT devices 1200.

Figure 17:
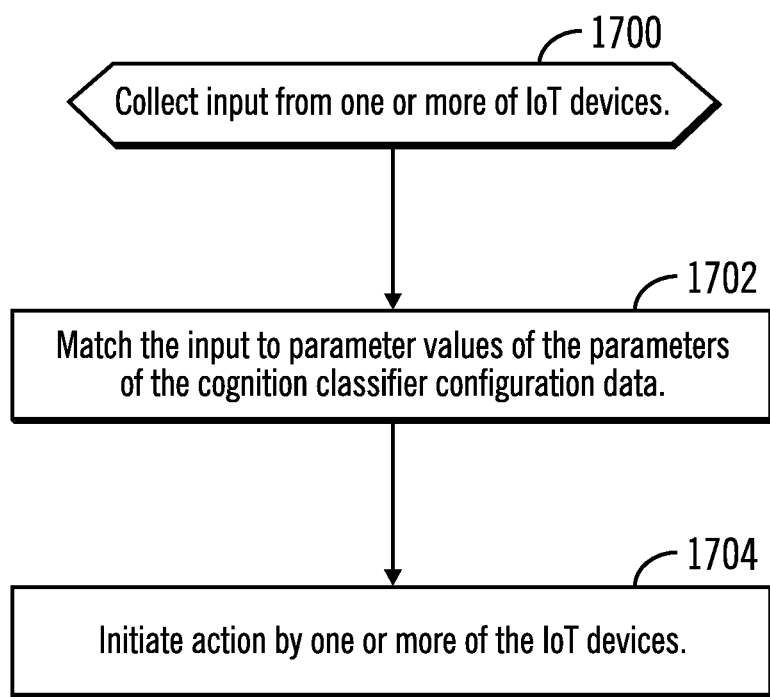
FIG. 17 illustrates, in a flowchart, operations for providing multi-dimensional cognition for unified cognition in cognitive assistance in accordance with certain embodiments.

FIG. 17 illustrates, in a flowchart, operations for providing multi-dimensional cognition for unified cognition in cognitive assistance in accordance with certain embodiments. In block 1700, the cognitive classifier 1230 collects input from one or more of the IoT devices 1200. In block 1702, the cognitive classifier 1230 matches the input to parameter values of the parameters of the cognitive classifier configuration data 1250. In block 1704, the cognitive classifier 1230 initiates action by one or more of the IoT devices.

Figure 18:
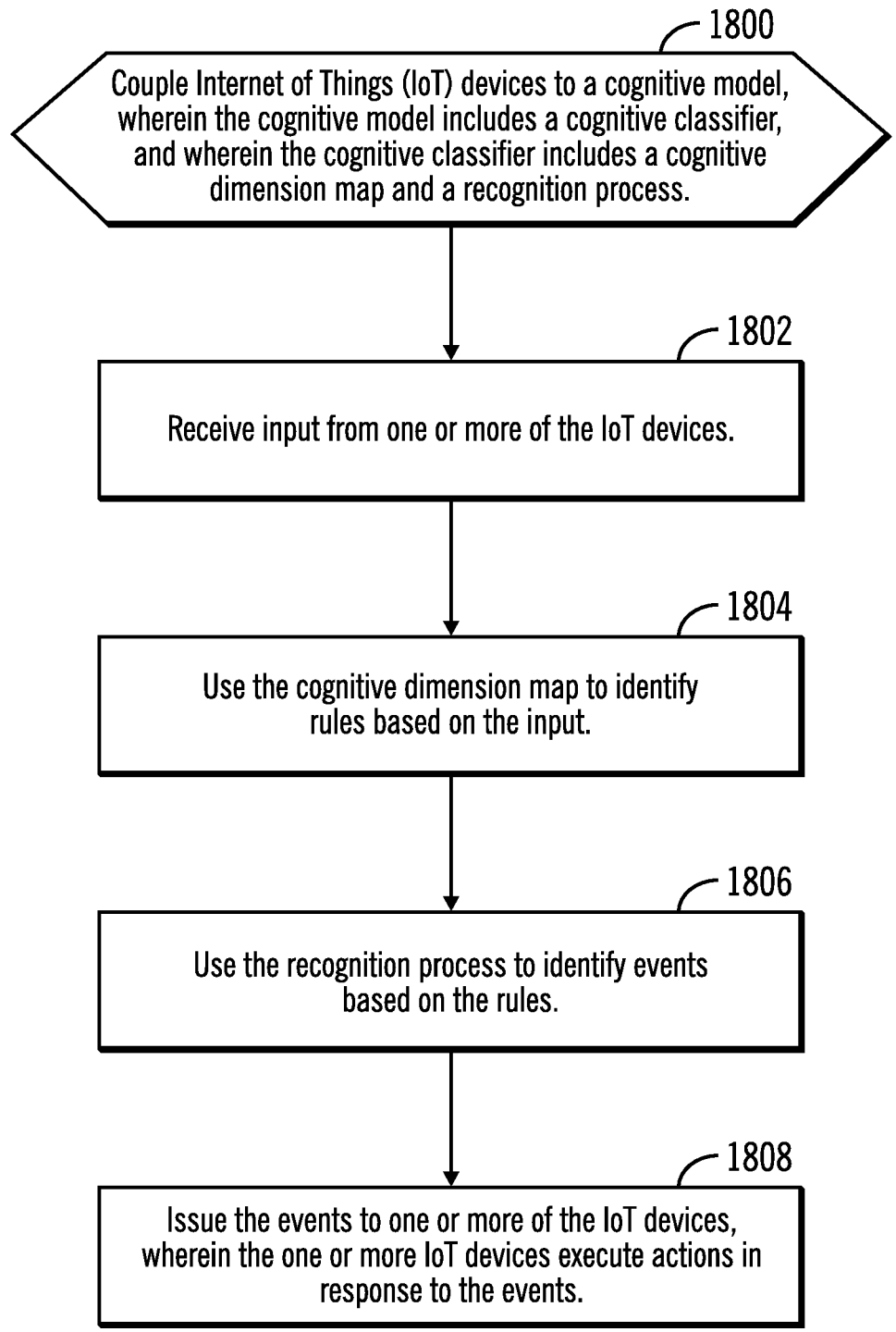
FIG. 18 illustrates, in a flowchart, operations for providing multi-dimensional cognition for unified cognition in cognitive assistance in accordance with additional embodiments.

FIG. 18 illustrates, in a flowchart, operations for providing multi-dimensional cognition for unified cognition in cognitive assistance in accordance with additional embodiments. Control begins at block 1800 with Internet of Things (IoT) devices being coupled to a cognitive model, wherein the cognitive model includes a cognitive classifier, and wherein the cognitive classifier includes a cognitive dimension map and a recognition process. In block 1802, the cognitive classifier 1230 receives input from one or more of the IoT devices. In block 1804, the cognitive classifier 1230 uses the cognitive dimension map to identify rules based on the input. In block 1806, the cognitive classifier 1230 uses the recognition process to identify events based on the rules. In block 1808, the cognitive classifier 1230 issues the events to one or more of the IoT devices, wherein the one or more IoT devices execute actions in response to the events.

Thus, embodiments provide multi-dimensional cognition to enable cognitive assistance and augmented intelligence in more than one type of cognitive service. Embodiments provide a 360 ("all around" or "all encompassing") cognitive model that serves the purpose of enumerating each cognitive dimension. Moreover, embodiments provide a cognitive classifier that includes a cognitive dimension map and a recognition process. The cognitive dimension map lists one or more cognitive services that participate in the classification of "intent" or "entity". The recognition process provides a definition of how each cognitive service in the cognitive dimension map works with the other cognitive services to recognize what is set out in this cognitive classifier. The recognition process may be described as a set of rules for receiving inputs from IoT devices and generating the events and recommendations.

Embodiments work with different document types, such as 1) image and video data for the cognition dimension of vision recognition, 2) audio and acoustic data for the cognition dimension of acoustic recognition, 3) text and documents for the cognition dimension of knowledge and reasoning, 4) sentiment data for the cognition dimension of affective processing, and 5) kinetics data for the cognition dimension of movement processing.

Embodiments integrate different cognitive capabilities, which may be from different data sources (e.g., different IoT devices) of: vision (seeing), acoustic (hearing), knowledge, natural language processing (conversation), etc. for the purpose of unified cognition as a product of sight, hearing, knowledge, dialogs, etc., producing a unified cognition more resembling human cognition, whose cognitive processes come from the integrated senses of seeing, hearing, etc.

Computing Environment

Figure 19:
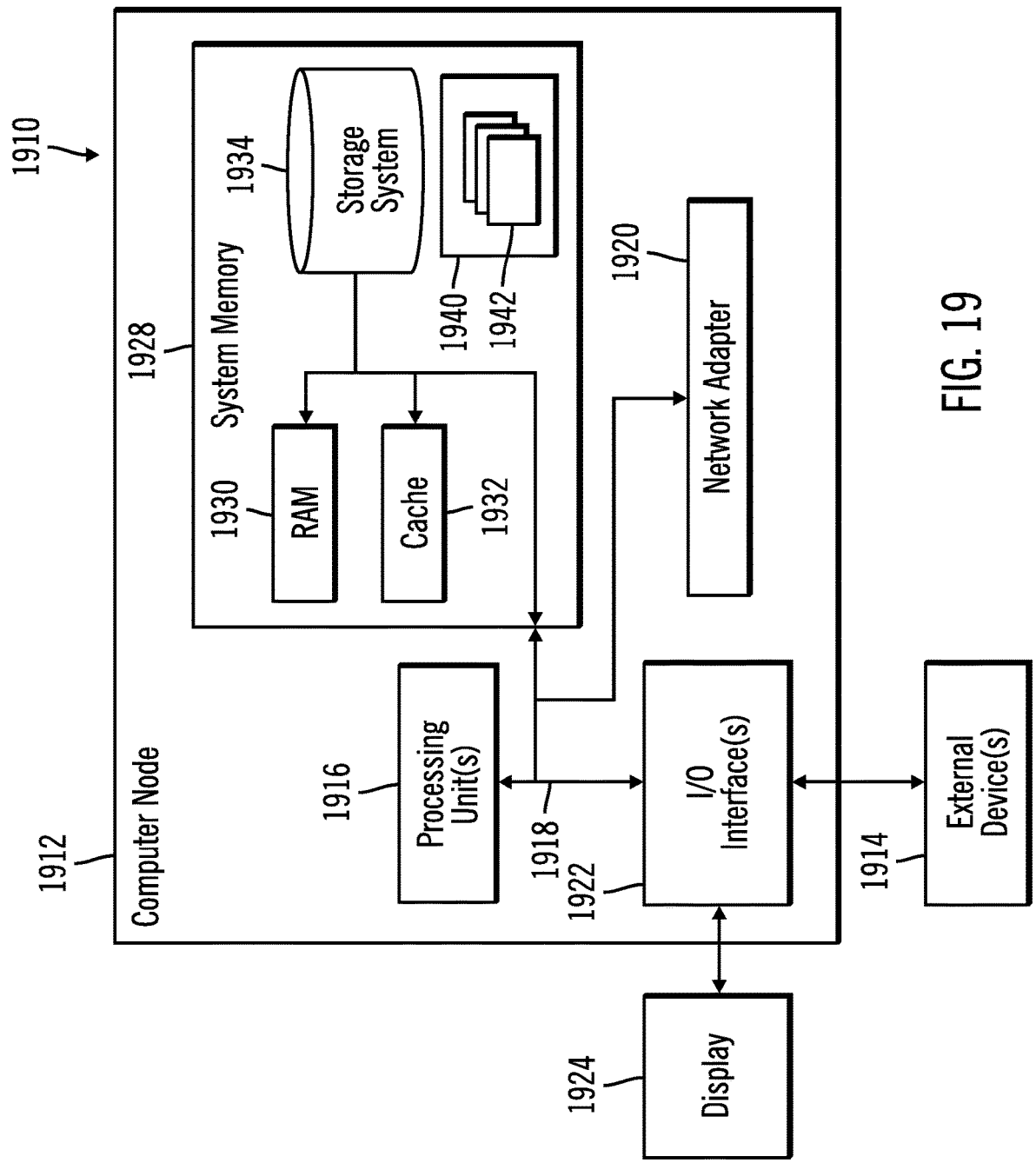
FIG. 19 illustrates a computing node in accordance with certain embodiments.

FIG. 19 illustrates a computing environment 1910 in accordance with certain embodiments. In certain embodiments, the computing environment is a cloud computing environment. Referring to FIG. 19, computer node 1912 is only one example of a suitable computing node and is not intended to suggest any limitation as to the scope of use or functionality of embodiments of the invention described herein. Regardless, computer node 1912 is capable of being implemented and/or performing any of the functionality set forth hereinabove.

The computer node 1912 may be a computer system, which is operational with numerous other general purpose or special purpose computing system environments or configurations. Examples of well-known computing systems, environments, and/or configurations that may be suitable for use with computer node 1912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1912 may be described in the general context of computer system executable instructions, such as program modules, being executed by a computer system. Generally, program modules may include routines, programs, objects, components, logic, data structures, and so on that perform particular tasks or implement particular abstract data types. Computer node 1912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer node 1912 is shown in the form of a general-purpose computing device. The components of computer node 1912 may include, but are not limited to, one or more processors or processing units 1916, a system memory 1928, and a bus 1918 that couples various system components including system memory 1928 to one or more processors or processing units 1916.

Bus 1918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1912 typically includes a variety of computer system readable media. Such media may be any available media that is accessible by computer node 1912, and it includes both volatile and non-volatile media, removable and non-removable media.

System memory 1928 can include computer system readable media in the form of volatile memory, such as random access memory (RAM) 1930 and/or cache memory 1932. Computer node 1912 may further include other removable/non-removable, volatile/non-volatile computer system storage media. By way of example only, storage system 1934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1918 by one or more data media interfaces. As will be further depicted and described below, system memory 1928 may include at least one program product having a set (e.g., at least one) of program modules that are configured to carry out the functions of embodiments of the invention.

Program/utility 1940, having a set (at least one) of program modules 1942, may be stored in system memory 1928 by way of example, and not limitation, as well as an operating system, one or more application programs, other program modules, and program data. Each of the operating system, one or more application programs, other program modules, and program data or some combination thereof, may include an implementation of a networking environment. Program modules 1942 generally carry out the functions and/or methodologies of embodiments of the invention as described herein.

Computer node 1912 may also communicate with one or more external devices 1914 such as a keyboard, a pointing device, a display 1924, etc.; one or more devices that enable a user to interact with computer node 1912; and/or any devices (e.g., network card, modem, etc.) that enable computer node 1912 to communicate with one or more other computing devices. Such communication can occur via Input/Output (I/O) interfaces 1922. Still yet, computer node 1912 can communicate with one or more networks such as a local area network (LAN), a general wide area network (WAN), and/or a public network (e.g., the Internet) via network adapter 1920. As depicted, network adapter 1920 communicates with the other components of computer node 1912 via bus 1918. It should be understood that although not shown, other hardware and/or software components could be used in conjunction with computer node 1912. Examples, include, but are not limited to: microcode, device drivers, redundant processing units, external disk drive arrays, RAID systems, tape drives, and data archival storage systems, etc.

In certain embodiments, the personalized embodied cognition manager 110, the cloud agent registry 150, and/or the personalized embodied cognition IDE 160 may have the architecture of computer node 1012. In certain embodiments, the personalized embodied cognition manager 110, the cloud agent registry 150, and/or the personalized embodied cognition IDE 160 are part of a cloud infrastructure. In certain alternative embodiments, the personalized embodied cognition manager 110, the cloud agent registry 150, and/or the personalized embodied cognition IDE 160 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 20:
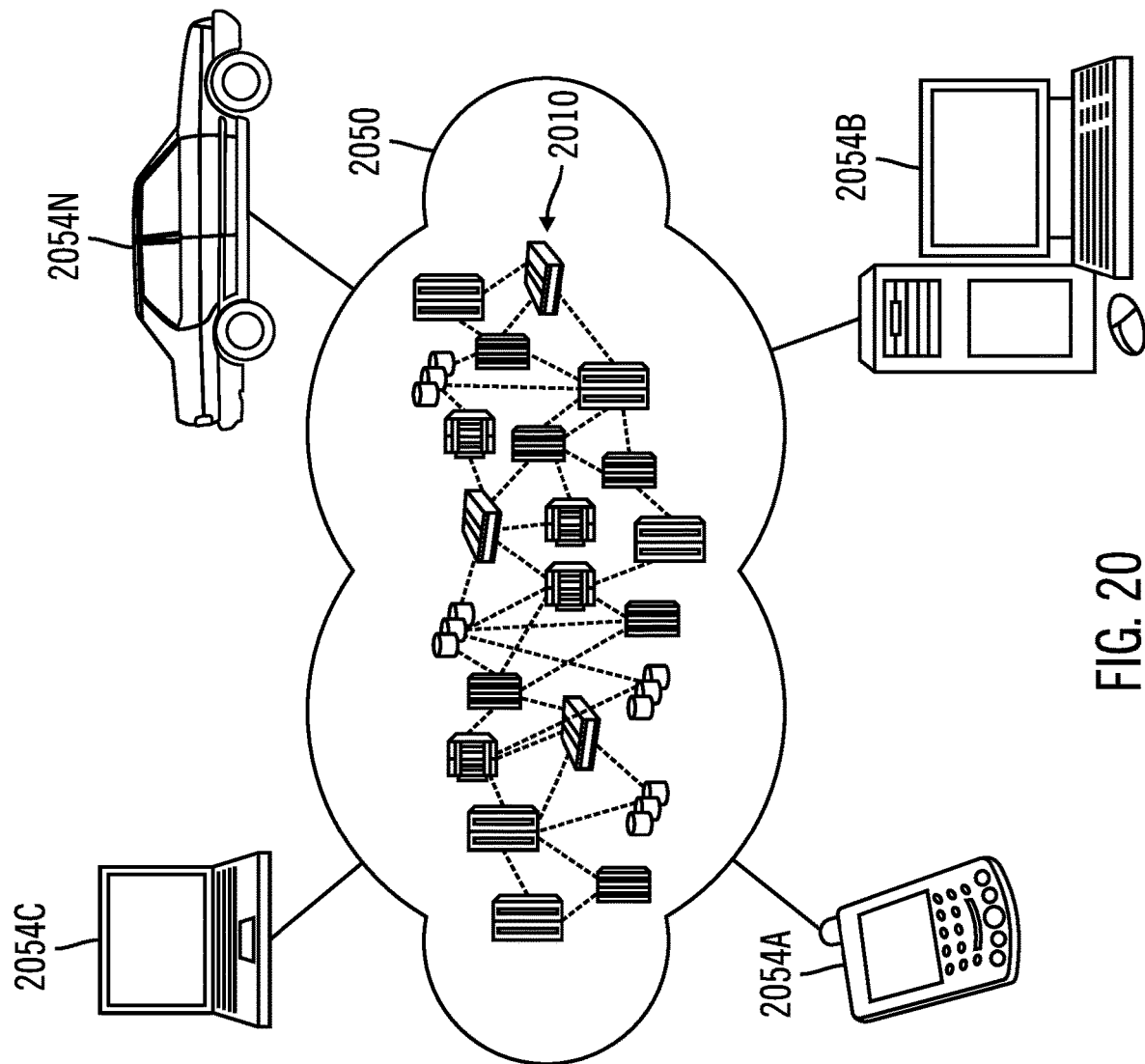
FIG. 20 illustrates a cloud computing environment in accordance with certain embodiments.

Referring now to FIG. 20, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 20 are intended to be illustrative only and that computing nodes 2010 and cloud computing environment 2050 can communicate with any type of computerized device over any type of network and/or network addressable connection (e.g., using a web browser).

Referring now to FIG. 21, a set of functional abstraction layers provided by cloud computing environment 2050 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 2160 includes hardware and software components. Examples of hardware components include: mainframes 2161; RISC (Reduced Instruction Set Computer) architecture based servers 2162; servers 2163; blade servers 2164; storage devices 2165; and networks and networking components 2166. In some embodiments, software components include network application server software 2167 and database software 2168.

Virtualization layer 2170 provides an abstraction layer from which the following examples of virtual entities may be provided: virtual servers 2171; virtual storage 2172; virtual networks 2173, including virtual private networks; virtual applications and operating systems 2174; and virtual clients 2175.

In one example, management layer 2180 may provide the functions described below. Resource provisioning 2181 provides dynamic procurement of computing resources and other resources that are utilized to perform tasks within the cloud computing environment. Metering and Pricing 2182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2183 provides access to the cloud computing environment for consumers and system administrators. Service level management 2184 provides cloud computing resource allocation and management such that required service levels are met. Service Level Agreement (SLA) planning and fulfillment 2185 provide pre-arrangement for, and procurement of, cloud computing resources for which a future requirement is anticipated in accordance with an SLA.

Workloads layer 2190 provides examples of functionality for which the cloud computing environment may be utilized. Examples of workloads and functions which may be provided from this layer include: mapping and navigation 2191; software development and lifecycle management 2192; virtual classroom education delivery 2193; data analytics processing 2194; transaction processing 2195; and multi-dimensional cognition for unified cognition in cognitive assistance 2196.

Thus, in certain embodiments, software or a program, multi-dimensional cognition for unified cognition in cognitive assistance in accordance with certain embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
providing a cognitive model that comprises cognitive modules of nodes comprising:
cognitive modules of a context node comprising temporal context, location context, and social context,
cognitive modules of an interaction node comprising audio and vision,
cognitive modules of a recognition node comprising intent recognition, entity recognition, and emotion recognition,
cognitive modules of a knowledge node comprising domain knowledge and general knowledge, and
cognitive modules of a decision and action node comprising Internet of Things (IoT) commands and IoT services;
creating a cognitive classifier using a subset of the cognitive modules of the nodes, wherein the cognitive classifier comprises a cognitive dimension map that includes entries for the subset of the cognitive modules and a recognition process that indicates how each cognitive module of the subset of cognitive modules works with each other cognitive module of the subset of cognitive modules;
storing parameter values for parameters in a configuration file for the cognitive classifier;
deploying the cognitive classifier to interact with a plurality of Internet of Things (IoT) devices; and
by the cognitive classifier:
receiving input from the plurality of IoT devices, wherein a first IoT device provides input for a first cognitive module of the cognitive modules of a first node of the nodes, and wherein a second IoT device provides input for a second cognitive module of the cognitive modules of a second node of the nodes;
using the cognitive dimension map to identify rules based on the input by matching the input to the parameter values;
using the recognition process to identify events based on the rules; and
issuing the events to one or more of the plurality of IoT devices to execute actions in response to the events.

2. The computer-implemented method of claim 1, wherein a Software as a Service (SaaS) is configured to perform the operations of the computer-implemented method.

3. The computer-implemented method of claim 1, wherein the cognitive model includes a cognitive classification editor for use in creating the cognitive classifier.

4. The computer-implemented method of claim 1, further comprising operations for:
creating a first cognitive assistant agent with the subset of the cognitive modules of the cognitive classifier.

5. The computer-implemented method of claim 4, further comprising operations for:
creating another cognitive classifier using another subset of the cognitive modules of the nodes; and
creating a second cognitive assistant agent with the another subset of the cognitive modules of the another cognitive classifier, wherein the first cognitive assistant agent and the second cognitive assistant agent exchange messages.

* * * * *